(12) United States Patent
Chiarizio et al.

(10) Patent No.: US 10,477,477 B2
(45) Date of Patent: Nov. 12, 2019

(54) MODULAR WIRELESS MASS EVACUATION NOTIFICATION SYSTEM

(71) Applicant: Tyco Fire & Security GmbH, Neuhausen am Rheinfall (CH)

(72) Inventors: Martin A. Chiarizio, Coral Springs, FL (US); Robert Feltham, Fort Lauderdale, FL (US)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 0 days.

(21) Appl. No.: 16/267,448

(22) Filed: Feb. 5, 2019

(65) Prior Publication Data

US 2019/0174417 A1    Jun. 6, 2019

Related U.S. Application Data

(62) Division of application No. 15/637,666, filed on Jun. 29, 2017, now Pat. No. 10,212,664, which is a
(Continued)

(51) Int. Cl.
*H04W 52/02* (2009.01)
*G08B 25/10* (2006.01)
(Continued)

(52) U.S. Cl.
CPC ........ *H04W 52/0238* (2013.01); *G08B 17/00* (2013.01); *G08B 17/10* (2013.01);
(Continued)

(58) Field of Classification Search
CPC .............. H04W 52/0238; H04W 4/90; H04W 52/0216; H04W 56/0055; G08B 17/00;
(Continued)

(56) References Cited

U.S. PATENT DOCUMENTS

| 3,889,170 A | 6/1975 | Sarbacher et al. |
| 4,426,612 A | 1/1984 | Wicnienski et al. |

(Continued)

FOREIGN PATENT DOCUMENTS

| EP | 1 119 837 | 2/2004 |
| EP | 1 501 060 | 1/2005 |

(Continued)

OTHER PUBLICATIONS

Partial European Search Report, dated Feb. 3, 2016, from European Application No. 15184523.7, filed on Sep. 9, 2015. Seven pages.
(Continued)

*Primary Examiner* — Kerri L McNally
(74) *Attorney, Agent, or Firm* — HoustonHogle LLP

(57) ABSTRACT

Monitoring and mass notification systems, such as fire alarm systems, for use in occupied structures, and more particularly to wireless monitoring and mass notification systems include wireless base units that can be modular in design. This allows horns, mini horns, strobes, and audio messaging modules (e.g., speakers) to be physically plugged into the wireless base unit creating a unit with the appearance of a single physical unit. Preferably standardized plugs are used. In some cases, visual and audio modules (i.e., notification devices) have their own battery pack or external power interface. Each wireless base unit can optionally function as a repeater if it has dual transceivers (master transceiver and slave transceiver).

20 Claims, 19 Drawing Sheets

Related U.S. Application Data division of application No. 14/846,368, filed on Sep. 4, 2015, now Pat. No. 9,728,074.

(60) Provisional application No. 62/060,845, filed on Oct. 7, 2014, provisional application No. 62/047,982, filed on Sep. 9, 2014.

(51) Int. Cl.

| | | |
|---|---|---|
| *G08B 17/00* | (2006.01) | |
| *H04B 1/713* | (2011.01) | |
| *G08B 25/00* | (2006.01) | |
| *G08B 27/00* | (2006.01) | |
| *H04W 4/90* | (2018.01) | |
| *G08B 17/10* | (2006.01) | |
| *H04W 56/00* | (2009.01) | |

(52) U.S. Cl.
CPC ......... *G08B 25/007* (2013.01); *G08B 25/009* (2013.01); *G08B 25/10* (2013.01); *G08B 27/00* (2013.01); *G08B 27/008* (2013.01); *H04B 1/713* (2013.01); *H04W 4/90* (2018.02); *H04W 52/0216* (2013.01); *H04W 56/0055* (2013.01); *Y02D 70/1222* (2018.01); *Y02D 70/142* (2018.01); *Y02D 70/144* (2018.01); *Y02D 70/166* (2018.01); *Y02D 70/22* (2018.01)

(58) Field of Classification Search
CPC .... G08B 17/10; G08B 25/007; G08B 25/009; G08B 25/10; G08B 27/00; G08B 27/008; H04B 1/713
USPC .................................................... 340/539.16
See application file for complete search history.

(56) References Cited

U.S. PATENT DOCUMENTS

| | | | |
|---|---|---|---|
| 4,531,114 | A | 7/1985 | Topol et al. |
| 4,947,124 | A | 8/1990 | Hauser |
| 4,952,913 | A | 8/1990 | Pauley et al. |
| 4,956,597 | A | 9/1990 | Heavey et al. |
| 5,528,149 | A | 6/1996 | Chen |
| 5,726,573 | A | 3/1998 | Chen et al. |
| 5,969,436 | A | 10/1999 | Chalasani et al. |
| 6,078,269 | A | 6/2000 | Markwell et al. |
| 6,278,279 | B1 | 8/2001 | Daun-Lindberg et al. |
| 6,472,980 | B1 | 10/2002 | Jen et al. |
| 6,501,942 | B1 | 12/2002 | Weissman et al. |
| RE38,183 | E | 7/2003 | Kosich et al. |
| 6,914,533 | B2 | 7/2005 | Petite |
| 7,382,243 | B1 | 6/2008 | Shepher |
| 7,714,734 | B1 | 5/2010 | Billman |
| 7,817,031 | B2* | 10/2010 | Kates ..................... G08B 1/08 340/539.22 |
| 7,920,053 | B2 | 4/2011 | Pattok et al. |
| 7,936,264 | B2 | 5/2011 | Kates |
| 8,193,665 | B2 | 6/2012 | Eiden et al. |
| 8,194,592 | B2 | 6/2012 | Kore et al. |
| 8,269,642 | B2 | 9/2012 | Morita et al. |
| 8,392,606 | B2 | 3/2013 | Banks et al. |
| 8,456,278 | B1 | 6/2013 | Bergman et al. |
| 8,547,107 | B2 | 10/2013 | Abe et al. |
| 9,728,074 | B2 | 8/2017 | Chiarizio et al. |
| 9,875,644 | B2 | 1/2018 | Chiarizio et al. |
| 2004/0212497 | A1 | 10/2004 | Stilp |
| 2005/0159152 | A1 | 7/2005 | Tice et al. |
| 2005/0262216 | A1 | 11/2005 | Kashiwabara et al. |
| 2006/0082461 | A1 | 4/2006 | Andres et al. |
| 2007/0252688 | A1* | 11/2007 | Eisold .................. G08B 27/008 340/506 |
| 2007/0273511 | A1 | 11/2007 | Clary |
| 2008/0186173 | A1 | 8/2008 | Gates |
| 2009/0146801 | A1 | 6/2009 | Piccolo, III et al. |
| 2009/0147714 | A1 | 6/2009 | Jain et al. |
| 2009/0313659 | A1 | 12/2009 | Samuels |
| 2010/0194354 | A1 | 8/2010 | Gotou et al. |
| 2010/0315089 | A1 | 12/2010 | Rapich |
| 2010/0315224 | A1 | 12/2010 | Orsini et al. |
| 2011/0184541 | A1 | 7/2011 | Huang et al. |
| 2011/0298613 | A1 | 12/2011 | Ben Ayed |
| 2013/0024800 | A1 | 1/2013 | Sundriyal et al. |
| 2013/0120136 | A1 | 5/2013 | Johnson et al. |
| 2013/0336292 | A1 | 12/2013 | Kore et al. |
| 2014/0029604 | A1* | 1/2014 | Nicholls ........... H04W 56/0015 370/350 |
| 2014/0036914 | A1 | 2/2014 | Samuels |
| 2014/0062417 | A1 | 3/2014 | Li et al. |
| 2014/0241533 | A1* | 8/2014 | Gerrish .................. G08B 25/04 381/57 |

FOREIGN PATENT DOCUMENTS

| | | |
|---|---|---|
| EP | 1 057 318 | 11/2011 |
| EP | 2 469 493 | 6/2012 |
| EP | 2 677 508 | 12/2013 |
| WO | WO 2010/097965 | 9/2010 |

OTHER PUBLICATIONS

Extended European Search Report, dated Feb. 3, 2016, from European Application No. 15184521 .1, filed on Sep. 9, 2015. Nine pages.

Extended European Search Report, dated Jun. 15, 2016, from European Application No. 15184523.7, filed on Sep. 9, 2015. Thirteen pages.

* cited by examiner

MODULAR WIRELESS MASS EVACUATION NOTIFICATION SYSTEM

RELATED APPLICATIONS

This application is a Divisional of U.S. application Ser. No. 15/637,666, filed on Jun. 29, 2017, which is a Divisional of U.S. application Ser. No. 14/846,368, filed on Sep. 4, 2015, which claims the benefit under 35 U.S.C. § 119(e) of U.S. Provisional Application No. 62/047,982, filed on Sep. 9, 2014, and U.S. Provisional Application No. 62/060,845, filed on Oct. 7, 2014, all of which are incorporated herein by reference in their entirety.

This application is related to U.S. patent application Ser. No. 14/846,377, filed on Sep. 4, 2015, by the same inventors, and entitled MASTER SLAVE WIRELESS FIRE ALARM AND MASS NOTIFICATION SYSTEM, which application is incorporated herein by this reference.

BACKGROUND OF THE INVENTION

Fire alarm systems comprise a set of devices that function to detect and notify people when smoke and/or fire is present. Such systems typically include an alarm panel, initiating devices, and notification devices. The alarm panel functions as the hub of the system by monitoring inputs, monitoring system integrity, controlling outputs, and relaying information. Examples of initiating devices include manually actuated devices (e.g., fire alarm boxes/pull stations) as well as automatically actuated devices capable of responding to any number of physical changes associated with a fire such as smoke and heat. Notification devices primarily rely on audible alerts and visible alerts to notify occupants of the need to evacuate or take action. Recent updates to fire alarm codes and standards have led fire alarm system manufacturers to expand their systems with voice evacuation capabilities to provide mass notification capabilities including support for multiple types of messaging and prioritized messaging according to local facilities' emergency response plans.

Various types of fire alarm systems are known in the art. Traditionally, the various hardware components for such systems have been coupled to the alarm panel by hardwire connection (e.g., electrically conducting wires and cables). Such systems, however, are burdened by high installation, operation, and maintenance costs. As a result, advancements in the art have led to the development of wireless, radio frequency (RF) fire alarm systems. In such wireless systems, each initiating device, such as a smoke and heat detector, is capable of transmitting wireless signals to the alarm panel, which in turn is capable of wirelessly initiating the appropriate notification devices by transmission of an alert signal.

SUMMARY OF THE INVENTION

The present invention relates generally to monitoring and mass notification systems, such as fire alarm systems, for use in occupied structures, and more particularly to a wireless monitoring and mass notification system.

The wireless alarm systems of the background art suffer from a number of limitations and disadvantages that have prevented widespread acceptance and use. One significant problem associated with wireless notification systems is complying with the requirement that some alert signals be synchronized. This is dictated by Underwriters Laboratory (UL) and National Fire Protection Association (NFPA) specifications. Due to processing delays inherent in wireless systems that rely on repeaters to receive and re-transmit synchronization signals to subnet devices, these specifications that typically require synchronization to within 10 milliseconds (ms) can be difficult to meet. A further limitation burdening wireless notification systems involves having the wireless units listening almost continuously so as not to impose a delay on notification. Meeting this requirement typically significantly increases the power consumption, thereby limiting the application of battery powered systems. Accordingly, there exists a need for advancements in the field of wireless mass notification systems that overcome these and other limitations present in the art.

The present invention overcomes the limitations and disadvantages present in the art by providing a wireless mass notification system wherein the wireless units (e.g., RF units) are synchronized by initiation of wakeup modes scheduled at predetermined times to allow the RF units to receive messages with minimal power consumption.

All messages sent from the alarm panel include a time stamp indicating the message transmission time and a cumulative propagation delay value. After the RF unit processes a message, it compares the received time stamp to its local time and accounts for processing delays. Prior to any retransmission, the processing time delay is calculated and added to the cumulative propagation delay value along with the original transmission timestamp. Using a cumulative propagation delay value enables each subnet to be synchronized to the alarm panel system time by compensating for the processing time of each repeater level.

The tendency of electronic timing circuits to drift over time is addressed by continuously broadcasting a system beacon, including a system time stamp, to the system at regular intervals. Using the system time stamp, all the devices correct their individual time to match the global system time. Since this time stamp can be broadcast every second, if desired, the precision of the time-stamp can be continuously maintained.

Rather than relying on a calculated maximum system propagation delay, an actual maximum system propagation delay value is determined by receiving the cumulative propagation delay time of the repeaters and other devices. To reduce traffic, during a system status check, each repeater periodically sends its largest cumulative propagation delay for the devices in its subnet. The alarm panel compares the received values and has a quantitative and known value for maximum propagation delay. During system diagnostics, known delay and calculated delay are compared to determine how system dynamics might be affected by RF traffic and local RF conditions.

Alarm activation signals (i.e., turn on signals) are processed and broadcast to the system as a scheduled event wherein the scheduled event time is the current system time plus the maximum propagation time plus a suitable buffer time whereby all of the devices' corresponding alert signals are executed in sync with other devices in the network.

Power consumption is minimized by scheduled activation of RF receivers and evaluation of received messages by analysis of qualification headers associated with each message. If the header indicates that the message does not pertain to a particular RF unit then the unit will go back to a sleep mode whereby the RF units are capable of remaining in the sleep mode for a vast majority of time.

Power consumption and RF traffic are reduced by providing a modular design hardware architecture whereby each RF unit along with its associated horns, strobes, etc., is considered a single unique device.

Accordingly, it is an object of the present invention to provide advancements in the field of wireless fire alarm and mass notification systems as set forth above.

Another object of the present invention is to provide a wireless mass notification system wherein all RF units are synchronized.

Still another object of the present invention is to provide a wireless mass notification system wherein subnet system are synchronized using a propagation delay time stamp.

Yet another object of the present invention is to provide a wireless mass notification system wherein local RF units maintain synchronization by correcting the unit's local time based on a received time stamp.

Still another object of the present invention is to provide a wireless mass notification system wherein the actual maximum propagation delay is determined not calculated.

Another object of the present invention is to provide a wireless mass notification system wherein alarm events are scheduled based on the system's actual maximum propagation delay.

Yet another object of the present invention is to provide a mass notification system wherein power consumption is minimized by programming RF receivers to wake-up and check for messages at predetermined scheduled times.

In general, according to one aspect, the invention features a monitoring and mass notification system. The system comprises a control unit for broadcasting alert messages via addressable wireless links, a wireless base unit having a notification interface, a slave transceiver for receiving the alert messages from the control unit, and an identification address for distinguishing the wireless base unit from other wireless base units, and a notification device having a base interface for plugging into the notification interface of the wireless base unit. The notification device receives a notification command from the wireless base unit and the notification device generates an alarm notification in response to receiving the notification command from the wireless base unit based on the broadcasted alert messages associated with the identification address.

The notification device can be a horn, a strobe, or a speaker, etc. Further, the wireless base unit can comprise a rechargeable battery or a non-rechargeable battery. Further, in examples the notification device is independently powered from the wireless base unit, such as with a battery, an external power source, or an energy harvesting unit.

The wireless base unit is often configured to receive device information for the notification device when the notification device is plugged into the wireless base unit. The wireless base unit is configured to report the device information to an alarm panel via the control unit for programming the notification device. Further, the wireless base unit can be configured to send a notification status check to the notification device in order to monitor the device information of the notification device on a periodic basis.

The device information may comprise a type of notification device, trouble device issues, and/or a tamper message. In an example, the wireless base unit may be configured to send a tamper message when the notification device is unplugged from the wireless base unit.

The notification command will often comprise activation information, deactivation information, sync protocol information, and/or battery load testing information of a load circuit on the notification device.

In an example embodiment, the wireless base unit is a repeater having a master transceiver for wirelessly rebroadcasting the alert messages to another wireless base unit.

In general, according to another aspect, the invention features a method for synchronizing a wireless base unit. The method comprises a control unit transmitting a system message having a timestamp that includes a control unit transmission time and a cumulative propagation delay time value. A wireless base unit receives the system message having the timestamp via wireless links, the wireless base unit records a receipt time based on a local time, the wireless base unit processes the system message, the wireless base unit calculates a processing time delay value based on a difference between the receipt time and the local time after processing the system message, the wireless base unit determines a new cumulative propagation delay time value by summing the processing time delay value with the received cumulative propagation delay time value and the control unit transmission time, and the wireless base unit updates the local time of the wireless base unit based on the new cumulative propagation delay time value.

The method can further comprise the control unit sending a time-correcting system beacon having a global system time to the wireless base unit and the wireless base unit updating the local time to match the global system time prior to the wireless base unit receiving the system message.

Often, the beacon is sent every second, and the global time is within a system timestamp having a resolution between about 100 microseconds and about 1.0 millisecond.

Preferably, the wireless base unit forwards the system message to another wireless base unit via wireless links, wherein the forwarded system message includes a new timestamp having the new cumulative propagation delay time value.

In general, according to another aspect, the invention features a method for determining a system maximum cumulative propagation delay time value for wireless base units. The method comprises wireless base units determining maximum cumulative propagation delay time values for their subnets, the wireless base units sending the determined maximum cumulative propagation delay time values to an alarm panel, and the alarm panel determining a system maximum cumulative propagation delay time value by comparing the maximum cumulative propagation delay time values received from the wireless base units.

In embodiments, a control unit sends a system status check to the wireless base units prior to the wireless base units determining the maximum cumulative propagation delay time values. Also, the determined maximum cumulative propagation delay time values are sent within an acknowledgement (ACK) message.

Finally, the alarm panel can predict system dynamics based on the determined system maximum cumulative propagation delay time value.

In general, according to another aspect, the invention features a method for scheduling an event for wireless base units. The method comprises an alarm panel determining a system maximum cumulative propagation delay time value, the alarm panel receiving an alarm turn on signal for an event, the alarm panel calculating a scheduled event time by summing the current time with the determined system maximum cumulative propagation delay time value, the alarm panel broadcasting the scheduled event time to the wireless base units, and the wireless base units executing the event in sync with each other based on the scheduled event time.

Preferably, calculating the event time comprises adding a buffer time to the sum of the current system time and the system maximum cumulative propagation delay time value. Also, the wireless base units can place the scheduled event time in a schedule buffer and set a pending alarm to turn on a flag at the scheduled event time.

In the current embodiment, the wireless base units synchronize at least one notification device based on the scheduled event time and the synchronized notification device can be a strobe synchronized to meet a predetermined lumens intensity, viewing angle, or flash rate with other synchronized strobes. The synchronized notification device can be a strobe synchronized within about 1 millisecond of other synchronized strobes.

The synchronized notification device can be an audio device having selectable patterns synchronized with other audio devices.

In general, according to another aspect, the invention features a method for minimizing power consumption for a wireless base unit by evaluating a message. The method comprises a control unit broadcasting a message having a header, the wireless base unit waking up from a sleep mode and receiving the message having the header, and the wireless base unit analyzing the header of the message to qualify if the message pertains to the wireless base unit. If the message pertains to the wireless base unit, the wireless base unit stays awake and processes the message, or if the message does not pertain to the wireless base unit, the wireless base unit changes from awake to sleep mode.

Preferably, prior to the control unit broadcasting the message, the control unit sends a predetermined scheduled wakeup time to the wireless base unit causing the wireless base unit to wake-up at the scheduled wakeup time to receive the message.

This scheduled wakeup time can be broadcast to multiple wireless base units synchronizing the multiple wireless base units to wake-up from sleep mode at the scheduled wakeup time.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
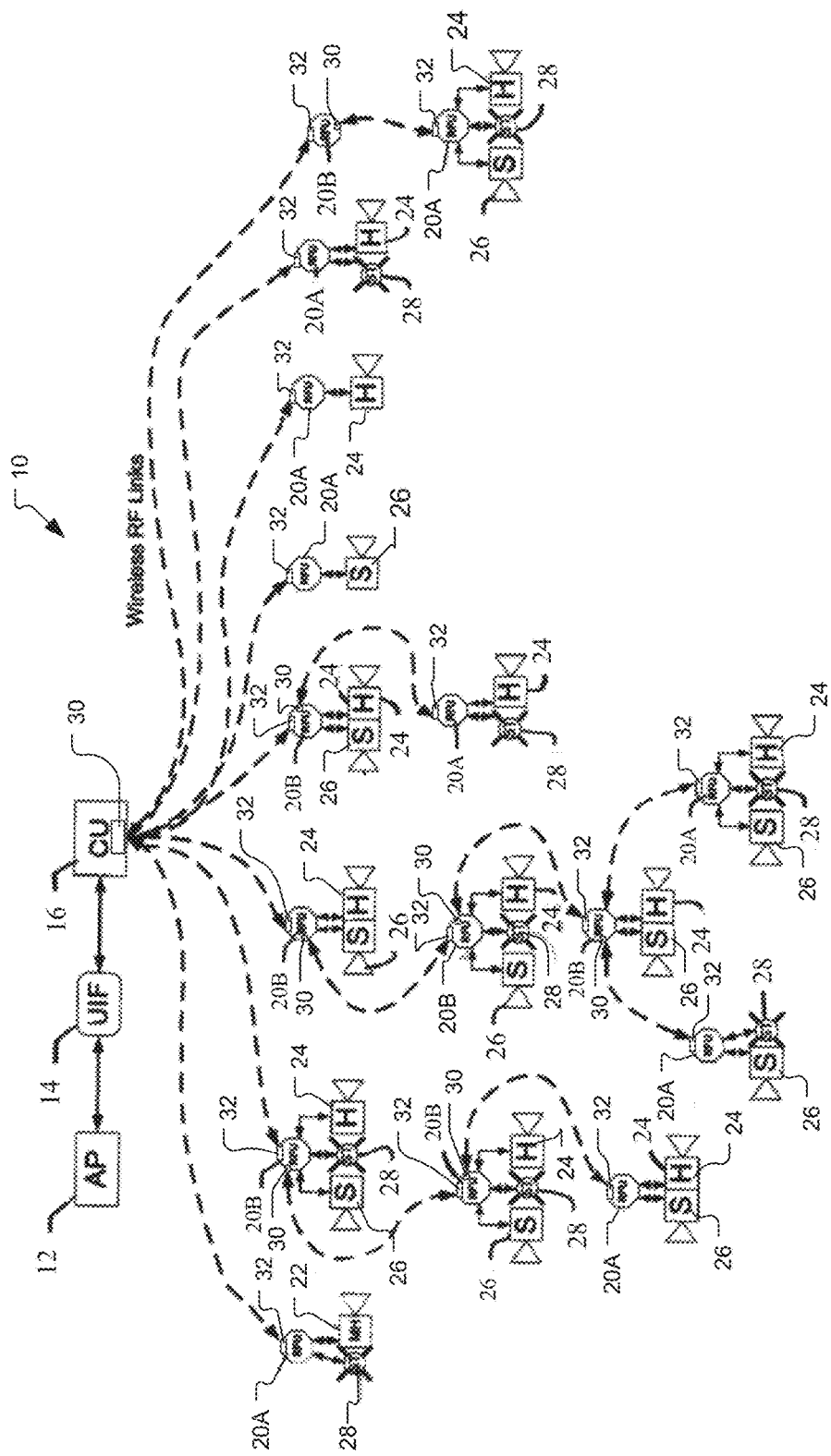
FIG. 1 is a schematic block diagram of a wireless mass evacuation notification system including RF base units in accordance with the present invention.

Turning now to the drawings, FIG. 1 is a schematic representation of a wireless mass evacuation notification system, generally referenced as 10, in accordance with the present invention. The system 10 is comprised of a control unit 16, a universal interface module (UIM) 14, an alarm panel 12, and intelligent wireless base units 20A, 20B (e.g., RF base units) that are automatically configured for multiple simultaneous alert methods by plugging in different annunciator modules (i.e., notification devices). Example notification devices include horns 24, mini horns 22, strobes 28, and speakers 26 for audio messages. All of the notification devices 22, 24, 26, 28 can be connected to at least one wireless base unit 20A, 20B. The wireless base units 20A, 20B can be configured as non-repeaters or repeaters, respectively. The repeater wireless base units 20B dynamically create a self-healing mesh network of synchronized alert mechanisms that is scalable, zone addressable, and single device-specific addressable.

The control unit 16 is used to program system zones, enroll devices, delete devices, etc. The control unit 16 has a standard interface with the UIM 14. The UIM 14 enables interfacing to existing fire panels, mass evacuation systems, etc. through a variety of interfaces (e.g., contact closure, serial, Ethernet, etc.) and can be customized to meet new interface requirements. To ease programmability, software programs/applications on PCs and on smart devices enable authorized end-users to program/configure the system 10 on their PCs or smart devices (e.g., smart phones, tablets, etc.). Also, strobes 28 are preferably synchronized within a precise time interval of each other to prevent seizures. Further, horns 24 preferably generate horn alerts that are synchronized to prevent mental confusion. Audio speakers 26 preferably generate messages that meet intelligibly requirements so that potential evacuees can understand the verbal instructions. These preferred requirements are provided in NFPA and UL specifications.

The wireless base units 20A, 20B can be battery operated, and the plug-in notification devices (e.g., horns 24 and strobes 28) can contain their own battery and/or other power supply. The driver circuitry for the devices is controlled by the wireless base unit 20A, 20B. When configured as a repeater wireless base unit 20B, an external power supply or additional batteries may be required for the wireless base unit 20B. Optionally, some of the wireless base units 20B may be configured as repeaters to dynamically create a self-healing hybrid-mesh network of repeater wireless base units 20B. All of the wireless base units 20A, 20B are synchronized creating a network of synchronized alert mechanisms that is scalable, zone addressable, and single device specific addressable. The system 10 uses time-correcting protocols and is a globally synchronized system. The system 10 is further synchronized and optimized for audio intelligibility and uses dual battery sources for RF and notification. The system 10 is optimized to use alternate energy sources, such as AC, wind, solar, etc. as needed for devices requiring higher power requirements while still retaining a wireless notification system.

Energy harvesting technology are used to recharge batteries in notification devices 22, 24, 26, 28 such as horns 24 and strobes 28 that are installed in locations where energy harvesting is feasible. On the other hand, non-rechargeable batteries are used in locations not conducive to energy harvesting. Alternatively, the notification devices 22, 24, 26, 28 such as audio speakers 26 may be powered by an external power pack. The decision of whether to use either a non-rechargeable battery or a rechargeable battery solution is based on current consumption and reasonable life-time expectancy of batteries.

As illustrated in FIG. 1, the wireless mass evacuation notification system 10 is adapted for integration and use with the alarm panel 12, which can include an existing control panel serving one or more buildings or facilities. The UIM 14 is provided to electrically interface with the alarm panel 12. Electric interfacing may be accomplished using any suitable interface hardware including without limitation: contact closures, serial connection, Ethernet, etc. The UIM 14 is adaptable and configurable to meet future interface requirements.

The control unit 16 is electrically interfaced with the UIM 14 and functions as a wireless enabled master control for the various wireless base units 20A, 20B as more fully discussed herein below. The control unit 16 is preferably adapted for wireless communication using Frequency Hopping Spread Spectrum ("FHSS") technology coupled with bi-directional RR communication and is preferably capable of supporting at least 1,024 addressable devices and repeaters while providing true network operation and communication.

Wireless base units 20A, 20B (hereinafter "RF base units") are remotely installed throughout the system 10 and configured for wireless communication with a master transceiver 30 of the control unit 16. Each RF base unit 20A, 20B is a wireless receiving unit. In particular, each RF base unit 20A, 20B has a slave transceiver 32 that receives alert messages from and sends status checks to the master transceiver 30 of the control unit 16, possibly through intervening repeaters 20B. The control unit 16 particularly uses its master transceiver 30 to broadcast alert messages to RF base units 20A, 20B via addressable wireless links.

A significant aspect present with RF base units 20A, 20B relates to the modular aspect of the RF base units 20A, 20B wherein each RF base unit 20A, 20B is modular and can function either alone or in combination with plug-in notification devices or annunciator modules including mini-horns 22, horns 24, speakers 26, or strobes 28 as illustrated in FIG. 1. When functioning as a stand-alone device, the RF base unit 20B can function as a signal repeater that receives alert message signals broadcast from the control unit 16 at its slave transceiver 32 and re-broadcasts the received alert message signals or other message signals via its master transceiver 30 to remotely located subnet of devices thereby effectively extending the range of wireless communications. This subnet of devices can include other RF base units 20A, 20B.

FIGS. 2A-3B schematically illustrate the main components of the RF base units 20A, 20B. In general, the RF base units 20A, 20B have controllers 34 that include unique identification addresses 38 for distinguishing RF base units 20A, 20B from one another. Also, the RF base units 20A, 20B include memory storage 31 that can store audio messages 39 (e.g., locally stored "canned" audio messages). The RF base units 20A, 20B can be powered by one or more internal batteries 21 and/or by an external power source 48 such as the A/C supply for the building. For example, the RF base units 20A, 20B receive power from the external power source 48 at external power interfaces 44. The batteries 21 can be configured to receive and store this external power. As described above, the RF base units 20A, 20B include slave transceivers 32 for communicating with either the control unit 16 or repeater RF base units 20B. The repeater RF base units 20B additionally include master transceivers 30 for repeating or forwarding messages to other RF base units 20A, 20B.

As illustrated in FIGS. 2A-3B, the RF base units 20A, 20B include one or more notification interfaces 36 that provide modular capabilities. The modular nature of RF base units 20A, 20B allows one or more notification devices 22, 24, 26, 28 (i.e., audio/visual devices) to be plugged directly into the notification interfaces 36 of the RF base units 20A, 20B such that the RF base units 20A, 20B automatically control the notification devices 22, 24, 26, 28. As shown, the notification devices 22, 24, 26, 28 have RF base interfaces 37 that are received by the notification interfaces 36 of the RF base units 20A, 20B. After this connection, the RF base unit 20A, 20B uses its controller 34 to send a notification command via the notification interface 36 (e.g., wired plug-in interface) to the notification device 22, 24, 26, 28. The notification device 22, 24, 26, 28 generates an alarm notification (i.e., activation) in response to receiving the notification command from the RF base unit 20A, 20B. This modular nature of the RF base units 20A, 20B is significant in reducing RF traffic thereby increasing the efficiency and capacity of the system 10.

Figure 2A:
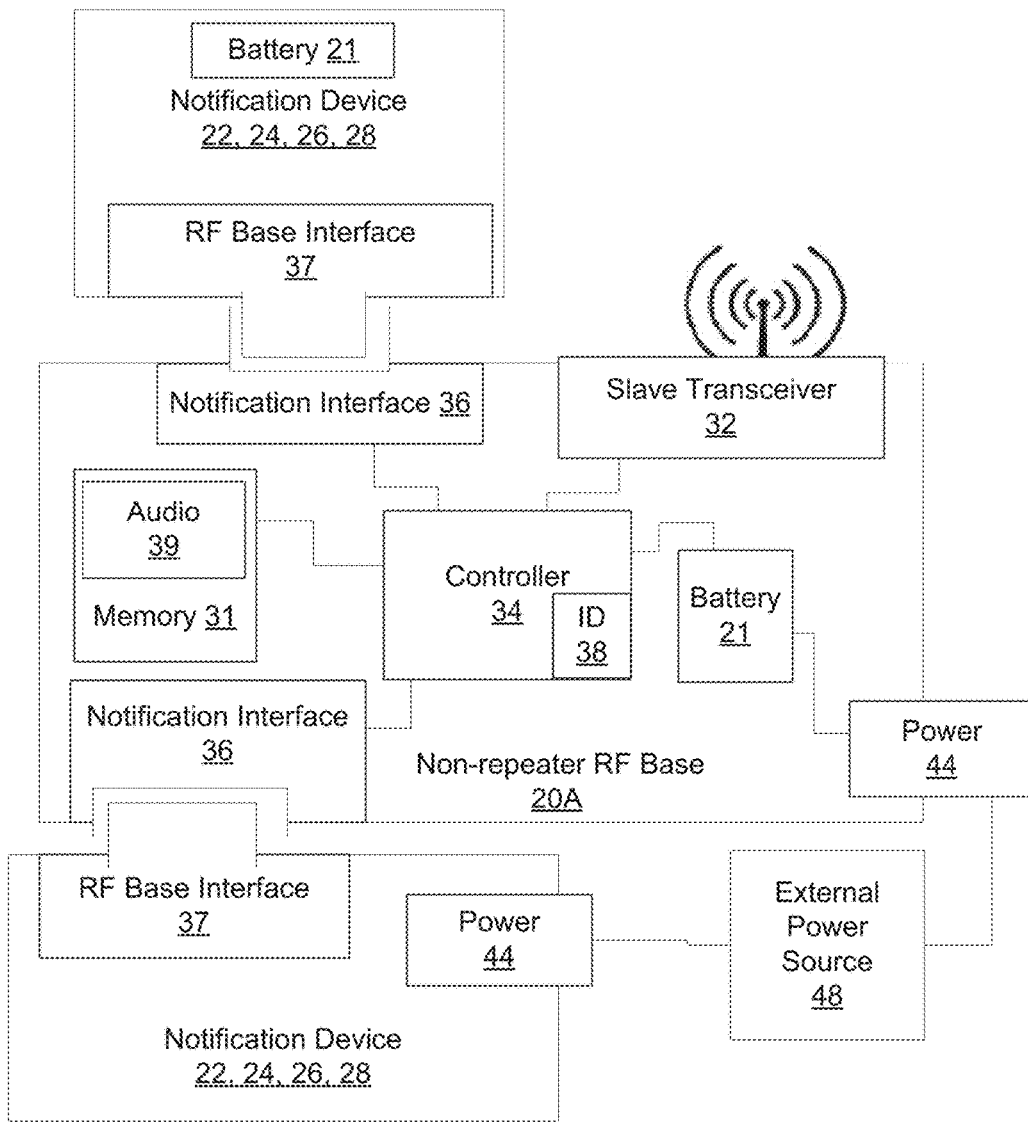
FIG. 2A is a schematic block diagram of a non-repeater RF base unit configured to accept plug-in notification devices.

As shown in FIGS. 2A-3B, the notification devices 22, 24, 26, 28 can be powered independently from the RF base units 20A, 20B. For example, as shown in FIG. 2A, the notification devices 22, 24, 26, 28 can be powered by battery 21 or by external power source 48 via the power interface 44.

Figure 2B:
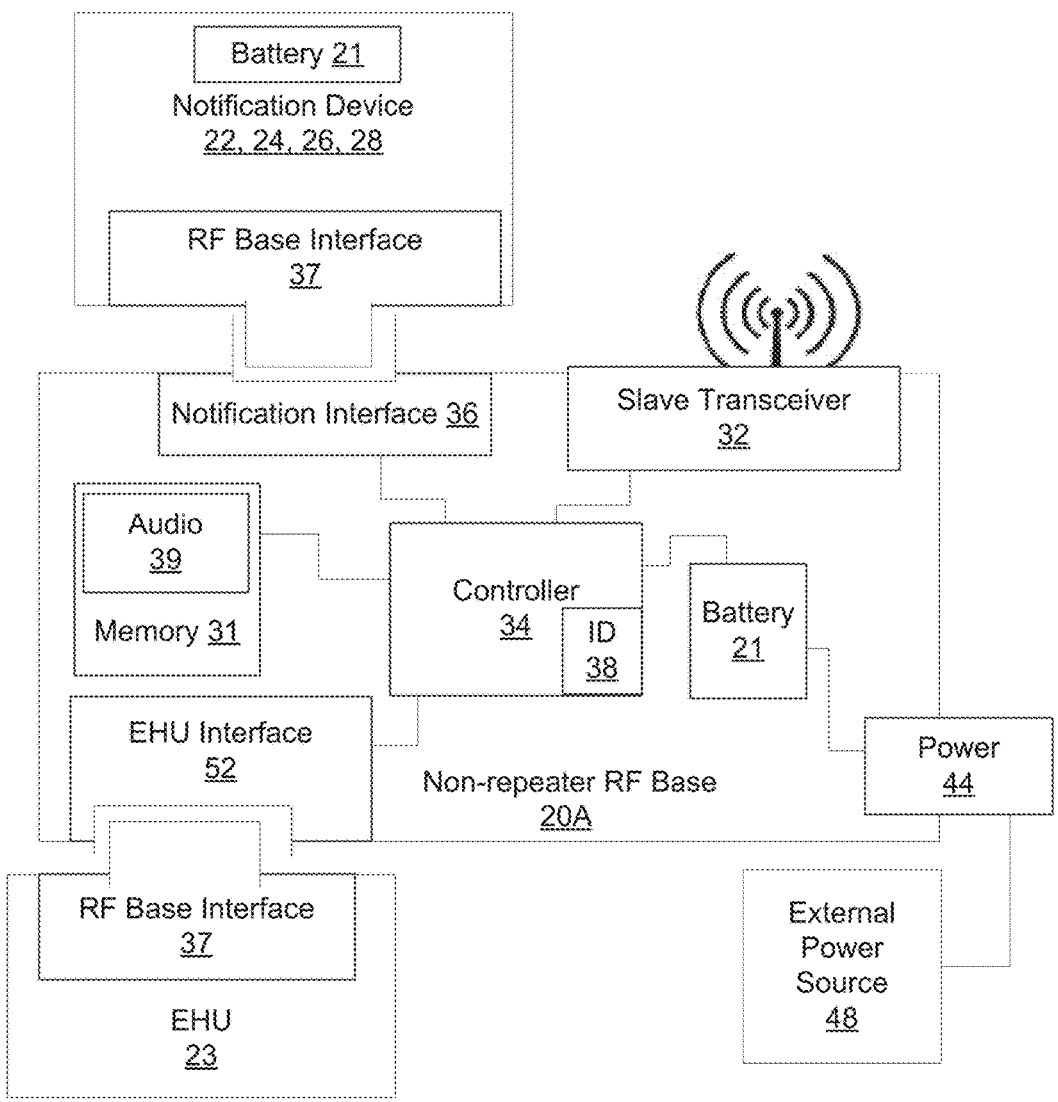
FIG. 2B is a schematic block diagram of the non-repeater RF base unit configured to accept plug-in notification devices and plug-in energy harvesting units.
Figure 3A:
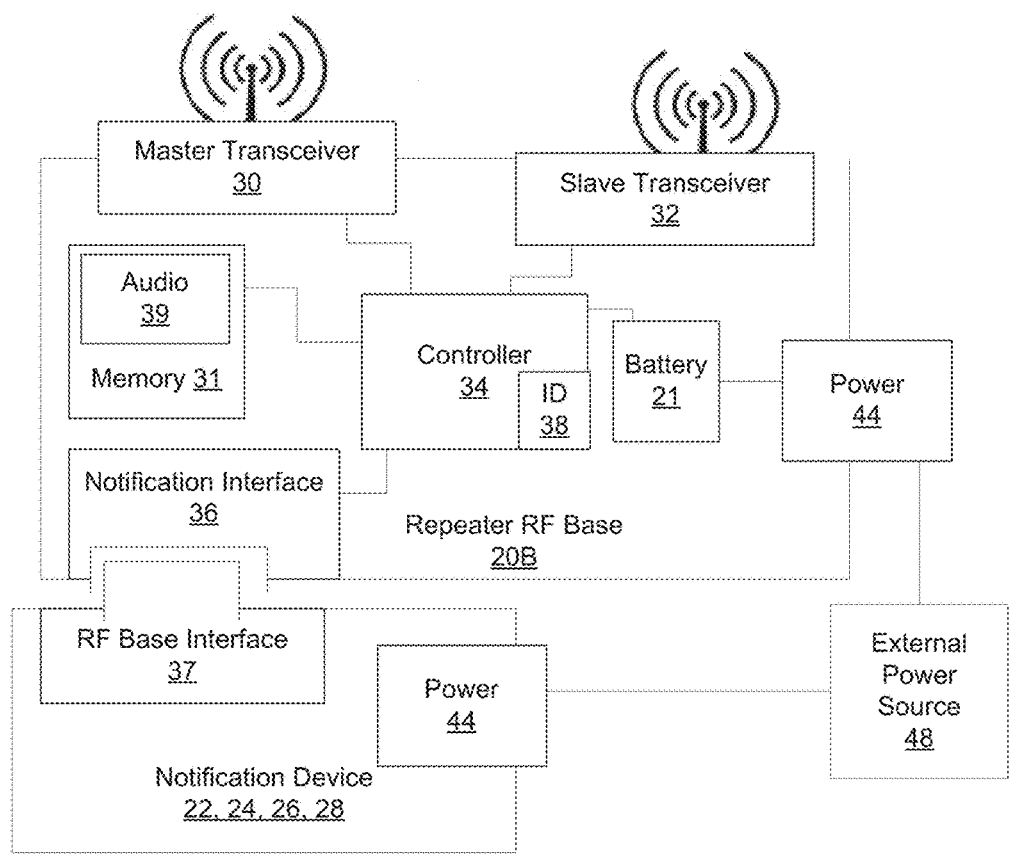
FIG. 3A is a schematic block diagram of a repeater RF base unit configured to accept separately-powered plug-in notification devices.
Figure 3B:
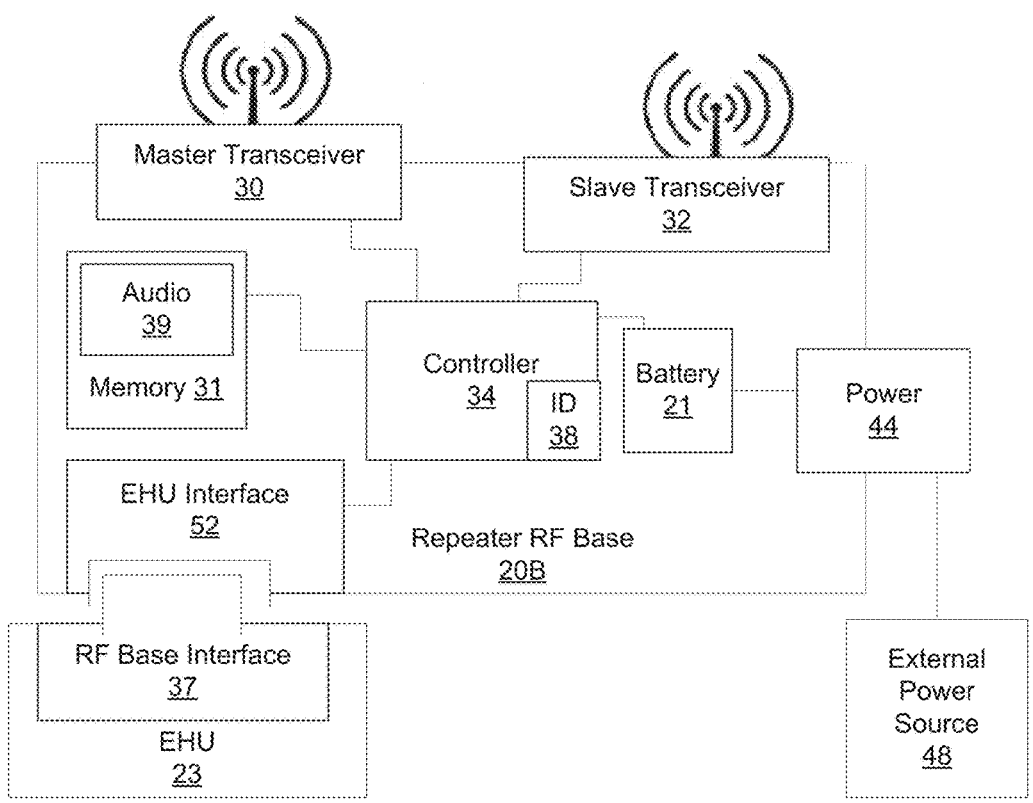
FIG. 3B is a schematic block diagram of the repeater RF base unit configured to accept plug-in notification devices and plug-in energy harvesting units.

FIGS. 2B and 3B illustrate an additional modular capability using an energy harvesting unit (EHU) 23. Similar to the notification devices 22, 24, 26, 28, the EHU 23 includes an RF base interface 37 that plugs into the notification interface 36 of the RF base unit 20A, 20B. The EHU 23 provides an alternative power source for the RF base unit 20A, 20B.

Figure 4A:
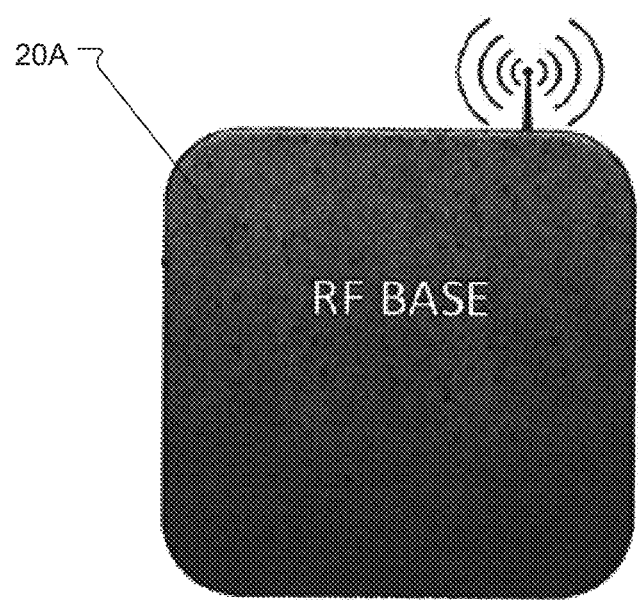
FIG. 4A is a block diagram of the non-repeater RF base unit.

FIG. 4A is a block diagram of the non-repeater RF base unit 20A of the present invention. The non-repeater RF base unit 20A is a receiving unit configured to receive alert messages directly or indirectly from the control unit 16 and to send status checks to the control unit 16.

Figure 4B:
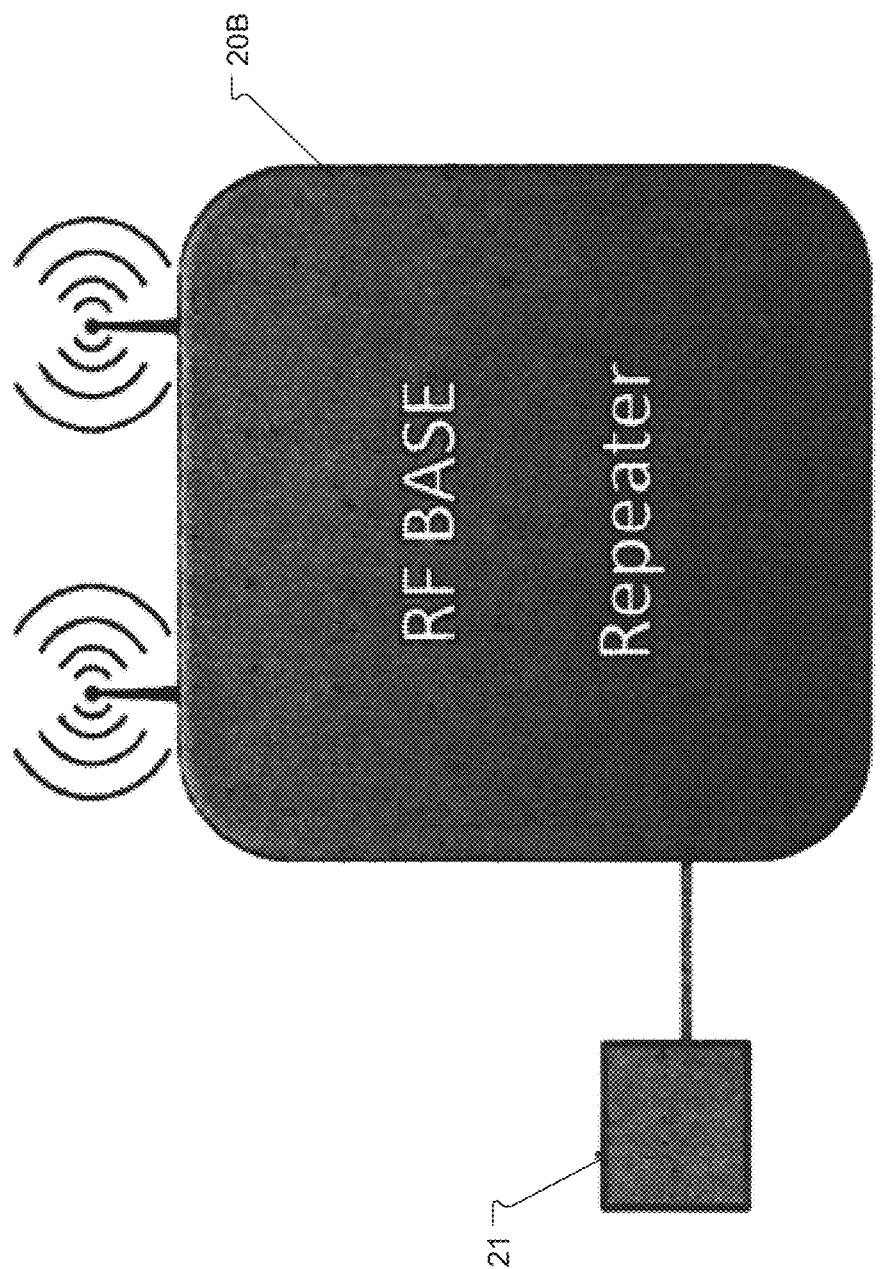
FIG. 4B is a block diagram of the repeater RF base unit.

FIG. 4B illustrates the repeater RF base unit 20B that provides repeater functionality. This repeater RF base unit 20B has an RF base unit circuit board that includes the master transceiver 30 that may be selectively activated to provide repeater functionality. As described above, the repeater RF base unit 20B can be powered by a battery 21, in one embodiment. For example, the battery 21 is a battery unit that includes a rechargeable battery or a non-rechargeable battery. The battery unit 21 can preferably include a rechargeable battery and a transformer adapter (e.g., 12 VAC transformer adapter).

Figure 4C:
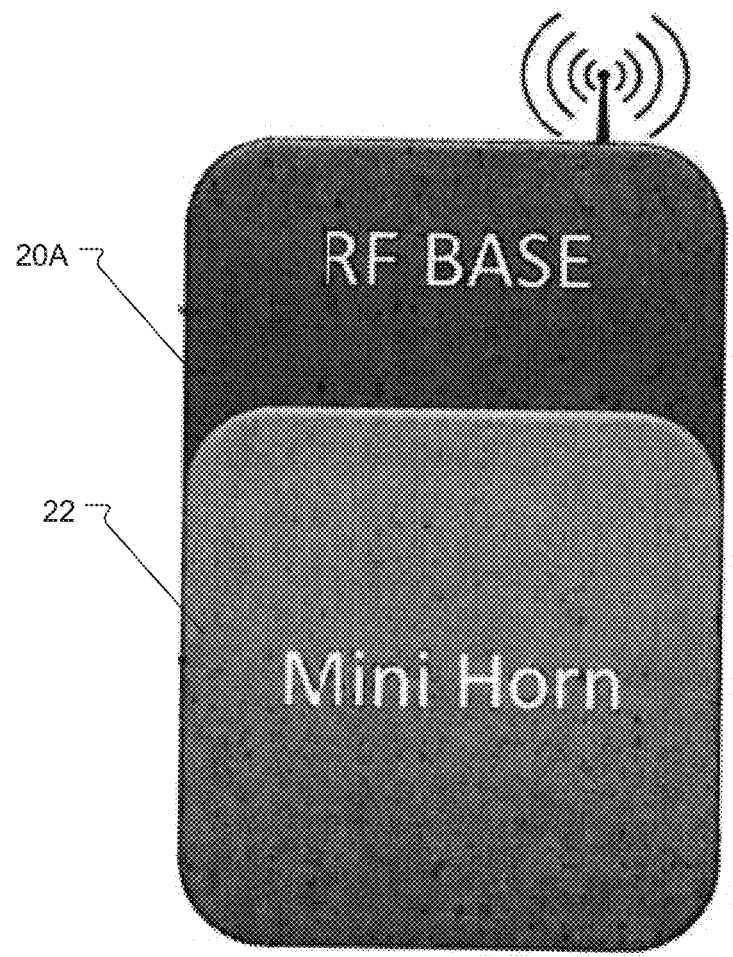
FIG. 4C is a plan view of the non-repeater RF base unit configured for use with a mini-horn.

FIG. 4C illustrates a plan view of the non-repeater RF base unit 20A configured for use with the mini-horn 22.

Figure 4D:
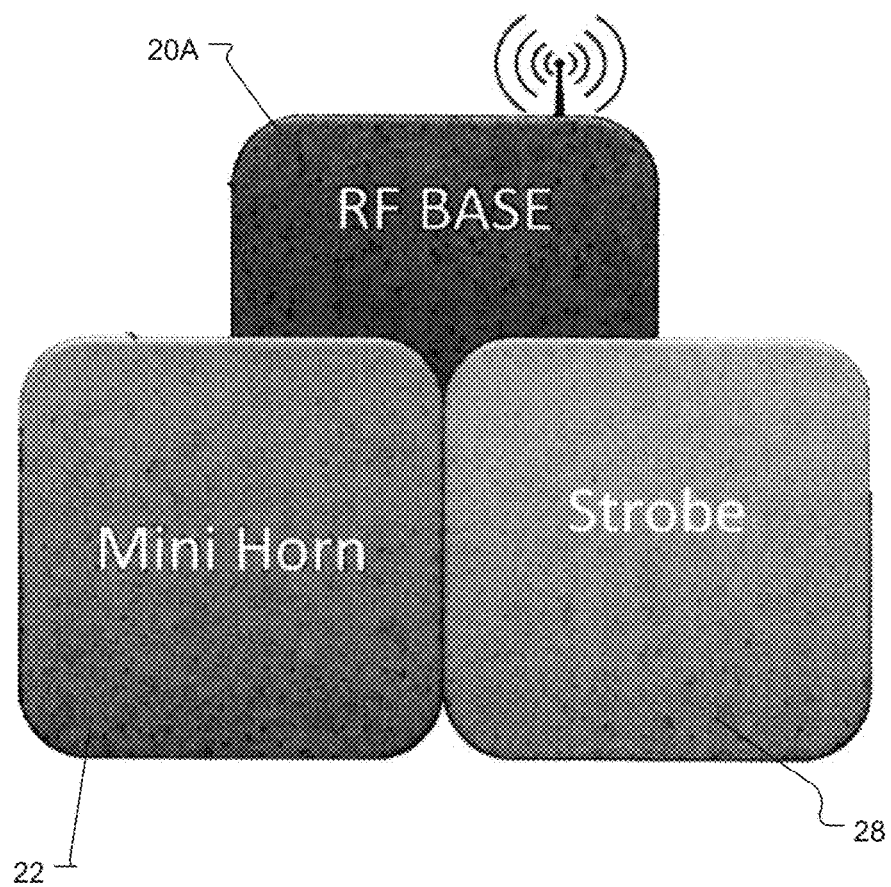
FIG. 4D is a plan view of the non-repeater RF base unit configured for use with a mini-horn and a strobe.

FIG. 4D illustrates a plan view of the non-repeater RF base unit 20A configured for use with the mini-horn 22 and strobe 28.

Figure 4E:
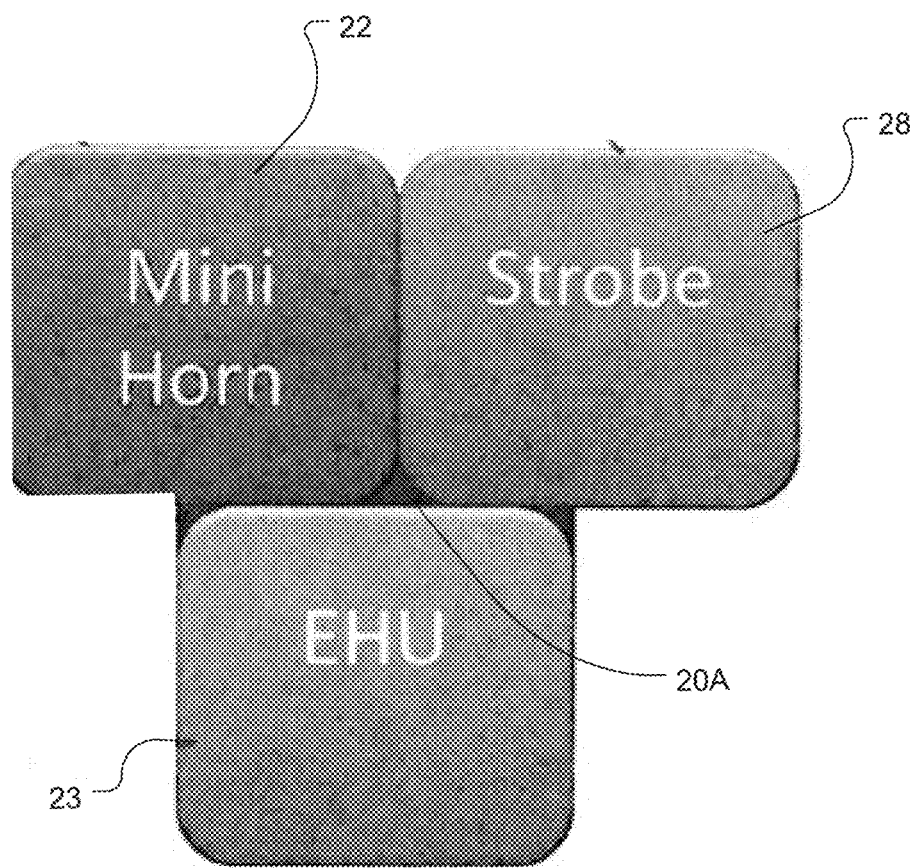
FIG. 4E is a plan view of the non-repeater RF base unit configured for use with a mini-horn, a strobe, and an energy harvesting unit.

FIG. 4E illustrates a plan view the non-repeater RF base unit 20A configured for use in combination with the mini-horn 22, the strobe 28, and the energy harvesting unit 23.

Figure 4F:
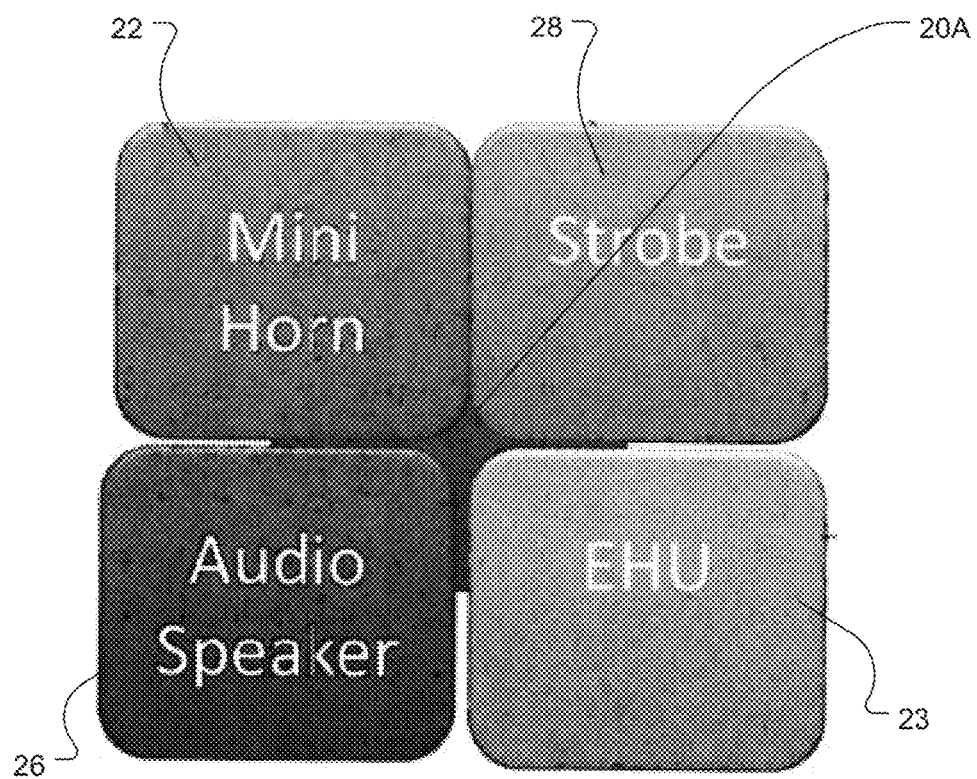
FIG. 4F is a plan view of the non-repeater RF base unit configured for use with a mini-horn, a strobe, an audio speaker, and an energy harvesting unit.

Finally, FIG. 4F illustrates a planned view of the non-repeater RF base unit 20A configured for use with the mini-horn 22, the speaker 26, the strobe 28, and the energy harvesting unit 23. In other examples, as appreciated by one of skill in the art, the non-repeater RF base unit 20A can be substituted with the repeater RF base unit 20B in FIGS. 4C-4F such that the repeater RF base unit 20B is configured for use with the mini horn 22, speaker 26, strobe 28, and/or energy harvesting unit 23.

One of the problems with RF systems is overwhelming the system with too much RF traffic such that the RF system is not responsive and consumes excess power from the batteries which is required to handle and process the large number of messages. By optimizing message structures, RF traffic can be reduced. One of the preferred requirements in hardwired systems and wireless systems is that all devices are monitored and device information (e.g., trouble detections) are reported within 200 seconds. In conventional systems, each notification device (e.g., horn, strobe, etc.) is considered a unique device with a unique serial number address. Having a unique serial number address for each notification device increases message traffic and increases the number of device addresses.

Figure 5:
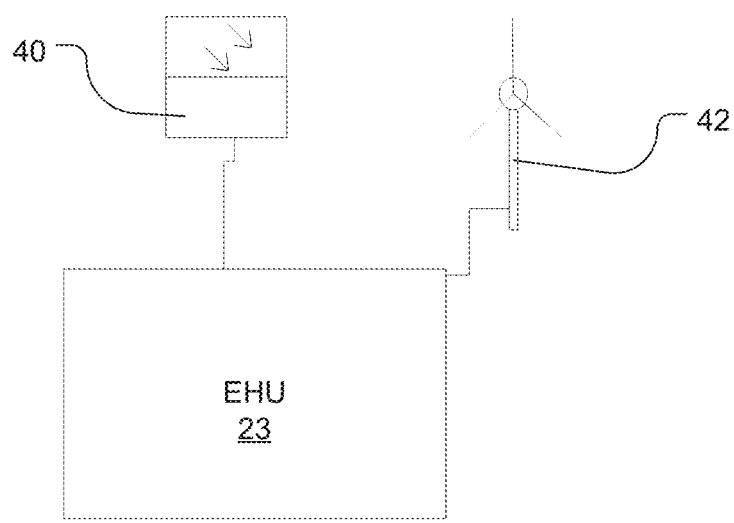
FIG. 5 is a schematic block diagram of the energy harvesting unit using a solar panel and/or a windmill to harvest energy, which are provided as example units and are not meant to limit potential energy harvesting sources.

The present invention overcomes this disadvantage by providing the wireless base unit 20A, 20B as an intelligent unit that is modular in function and design. When used in the system 10, only the wireless base unit 20A, 20B is treated as a device with a unique serial number address 38 (as shown in FIGS. 2A-3B), regardless of the number of plug-in notification devices 22, 24, 26, 28 employed. The wireless base unit 20A, 20B sends the notification command in response to receiving broadcasted alert messages that are associated with the identification address 38. In one example, the wireless base unit 20A, 20B has a dedicated battery 21 for its main processor, the RF circuitry, and the assorted interface circuits, etc. The plug-in notification devices 22, 24, 26, 28 have access to their own power source (e.g., battery 21 or external power source 48). In one example, the external power source 48 can be supplementary power modules that can be plugged into each notification device 22, 24, 26, 28 via external power interfaces 44. Supplementary power modules can include alarm battery packs, AC power sources with rechargeable batteries, or energy harvesting units 23. As illustrated in FIG. 5, the energy harvesting unit 23 can harvest energy using a solar panel 40 (i.e., harvest solar energy) and/or using a wind mill 42 (i.e., harvest wind energy). Other potential energy harvesting sources may be used with the energy harvesting unit 23, in other embodiments, as appreciated by one of skill in the art.

Figure 6:
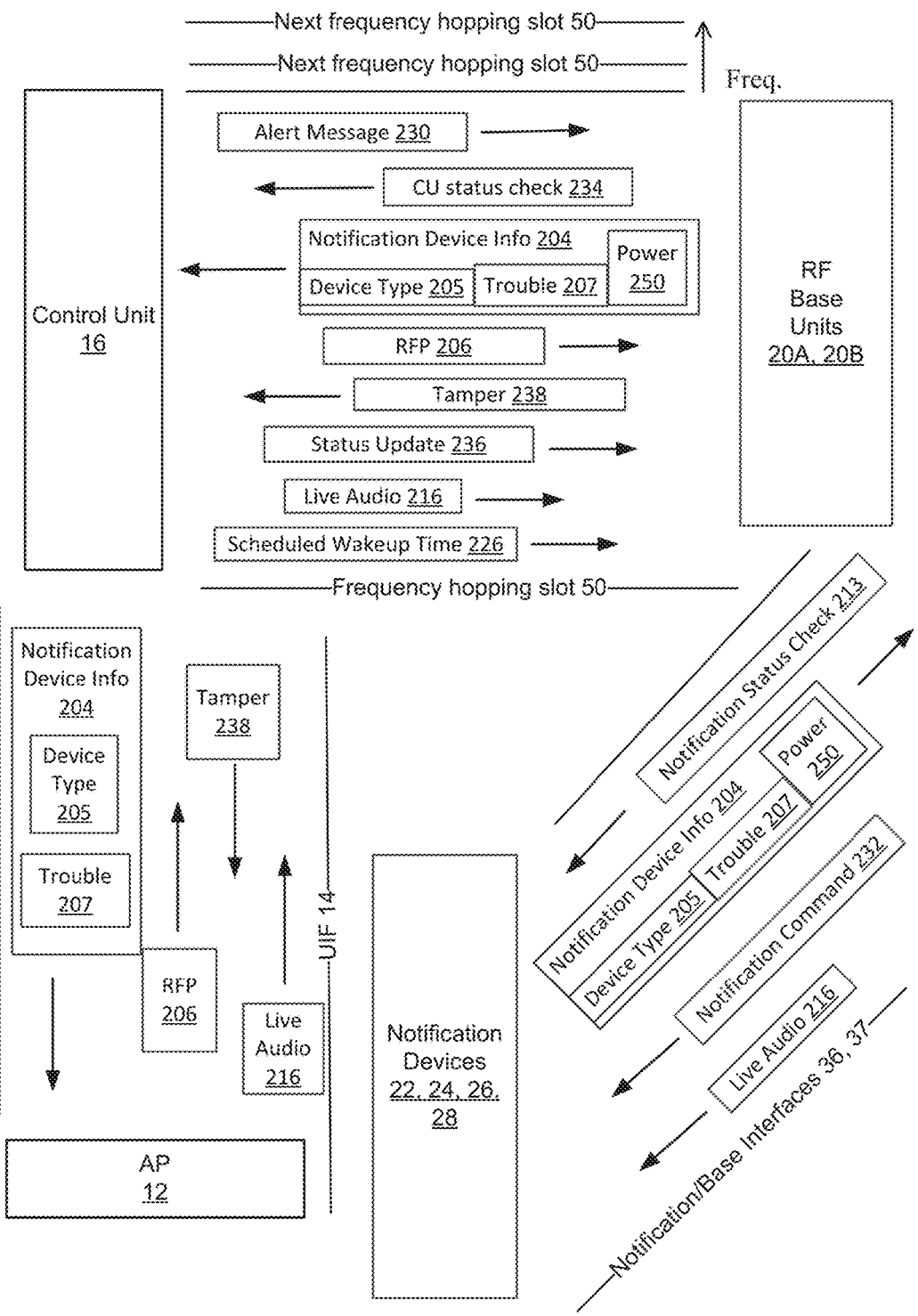
FIG. 6 is a schematic diagram of information and messages being exchanged between an alarm panel and a control unit, between the control unit and RF base units, and between RF base units and notification devices.

FIG. 6 illustrates the types of information exchanged between the alarm panel 12 and the control unit 16, the control unit 16 and the RF base units 20A, 20B, as well as communications between the RF base units 20A, 20B and the notification devices 22, 24, 26, 28. In this example, FHSS technology coupled with bi-directional communication is used for the wireless links between the control unit 16 and the RF base units 20A, 20B. The bi-directional wireless links enable messages to be sent or received between devices on the same wireless link. In this example, the wireless links are slots 50 of FHSS. The hopping pattern is structured in slots 50 to alternate between transmitting and receiving messages on each slot 50 such that balanced bi-directional communications are achieved.

When the notification device 22, 24, 26, 28 is plugged into the RF base unit 20A, 20B, its device type is recognized. In particular, the RF base units 20A, 20B are configured to receive notification device information 204 including device type 205 when the notification devices 22, 24, 26, 28 are plugged into the RF base units 20A, 20B (via notification/base interfaces 36, 37). The RF base units 20A, 20B are configured to report this device information 204 (including type of notification device 205) to the alarm panel 12 via the control unit 16. At the alarm panel 16, the device information 204 (including type of notification device 205 and/or notification device's functional aspect) is listed under the respective RF base unit ID address 38 so that an installer can program the response functions for at least one notification device 22, 24, 26, 28 of the respective RF base unit 20A, 20B (i.e., creating a response function program (RFP) 206). Then, this RFP 206 can be sent by the alarm panel 12 to the RF base units 20A, 20B via the control unit 16. The RF base units 20A, 20B process the RFP 206 and generate at least one notification command 232 based on the RFP 206 for controlling the notification devices 22, 24, 26, 28. These notification commands 232 are sent to the notification devices 22, 24, 26, 28. Upon detection of the notification device 22, 24, 26, 28, the RF base unit 20A, 20B knows that when it receives a matching alarm signal (i.e., receives alert message 230 from control unit 16) for the device function type (i.e., device type 205), the RF unit 20A, 20B can activate the notification device 22, 24, 26, 28 using the notification command 232.

The RF base unit 20A, 20B monitors device information 204 of its subnet of notification devices 22, 24, 26, 28. In particular, the RF base unit 20A, 20B monitors the device information 204 on a periodic basis and communicates the device information 204 to the control unit 16. For example, the RF base unit 20A, 20B can request device information 204 by sending a notification status check 213 to the notification devices 22, 24, 26, 28 in its subnet. The notification devices 22, 24, 26, 28 send device information 204 which can include trouble device issues 207 (i.e., trouble detected) to the RF base unit 20A, 20B. Then, the RF base unit 20A, 20B reports the device information 204 including the detected trouble device issues 207. The RF base unit 20A, 20B can also send tamper signals as tamper messages 238 to indicate that a notification device 22, 24, 26, 28 in its subnet was removed while continuing to report the trouble device issue 207 within the device information 204. The reporting will continue until such time as the notification device 22, 24, 26, 28 is re-installed or the user deletes the notification device 22, 24, 26, 28 from the RF base unit's device list on the alarm panel 12 at which time the alarm panel 12 sends status update message 236 to the RF base unit 20A, 20B saying that the notification device 22, 24, 26, 28 has been deleted. The notification device info 204 can also include a power status 250 indicating the power level of the notification device 22, 24, 26, 28. This power status 250 may be sent in response to the notification status check 213.

The RF base unit 20A, 20B automatically uses its controller 34 to handle all normal functions for the notification devices 22, 24, 26, 28 plugged into it. For example, the RF base unit 20A, 20B uses its controller 34 to send notification commands 232 that pertain to activation (i.e., turn-on signals), deactivation (i.e., turn on-off signals), sync protocol, and/or battery load testing of a load circuit on the notification device 22, 24, 26, 28.

Other messaging for RF base units 20A, 20B includes a control unit (CU) status check message 234 and live audio data 216. The CU status check message 234 is a general request for any updates (e.g., programming changes) for the RF base unit 20A, 20B and its subnet of notification devices 22, 24, 26, 28. The CU status check message 234 is sent by the RF base unit 20A, 20B to the control unit 16. The control unit 16 can respond by sending the status update 236. The alarm panel 12 may send the live audio data 216 to the RF base unit 20A, 20B via the control unit 16. The RF base unit 20A, 20B forwards this live audio data 216 to a speaker 26 for notification.

Wireless Sync Methodology

When an alarm condition that requires notification is detected, it must be indicated within 10 seconds. The biggest problem with notification is the requirement for all alert signals to be synchronized to UL and NFPA specifications, typically synchronized within 10 milli-seconds (ms). For example, strobes 28 must be synchronized within 10 ms of each other to prevent the inducement of seizures in people who have epilepsy. Horns 24 have temporal patterns that need to be synchronized to each other especially in large common areas. When these audible temporal patterns are not synchronized with each other, they can cause mental confusion since the especially loud sounds if not synchronized sound like a cacophony of noise.

Hard-wired systems have sync modules that put out special timing signals to the devices wired on the loop. Due to the high speed that electrical signals can travel through a wire, it is easy to synchronize notification devices within the wire loop until propagation delays and power limits of the loop combine to limit the number of devices that can be synchronized. With wireless systems, however, the notification signal (i.e., alarm message 230) is broadcast by the control unit 16 to all of the devices that the wireless signal (e.g., RF signal) can reach. In one example, repeater RF base units 20B can then receive the wireless signals which they rebroadcast (i.e., repeat) to devices within other subnets of devices, and so on and so on until all of the devices in all of the of subnets receive the signal. Each repeater RF base unit 20B, that receives a signal and then rebroadcasts the signal, has a finite processing delay between receiving, processing, and then rebroadcasting the signal to its local subnet.

Further, since all notifications should be indicated within 10 seconds of detection, the RF base units 20A, 20B preferably listen almost continuously so that they do not impose a delay on notification and which increases the power requirements so that a battery operated system (typically the most cost-effective solution) becomes very difficult to achieve. Even with very fast processors, it is not possible for all of the devices in a wireless network of devices to receive, process, and then activate (i.e., turn on) their notification devices 22, 24, 26, 28 within 10 ms of each other unless the above difficulties are overcome.

The present invention overcomes these limitations and disadvantages by wirelessly synchronizing notification devices to within 10 ms as discussed below.

Synchronized System

All of the RF base units 20A, 20B in the wireless notification system 10 are synchronized in accordance with a method that avoids having the RF base units 20A, 20B randomly wake-up and listen for RF signals. In accordance with the method of the present invention, all RF base units 20A, 20B wakeup at predetermined times and listen for messages that are meant for them. These synchronized scheduled wake-up times allow the system 10 to know when any RF base unit 20A, 20B will receive its RF messages. This feature is shown in FIG. 6 where the control unit 16 sends the scheduled wakeup time 226 to the RF base units 20A, 20B.

Propagation Delay Time Stamp

Figure 7A:
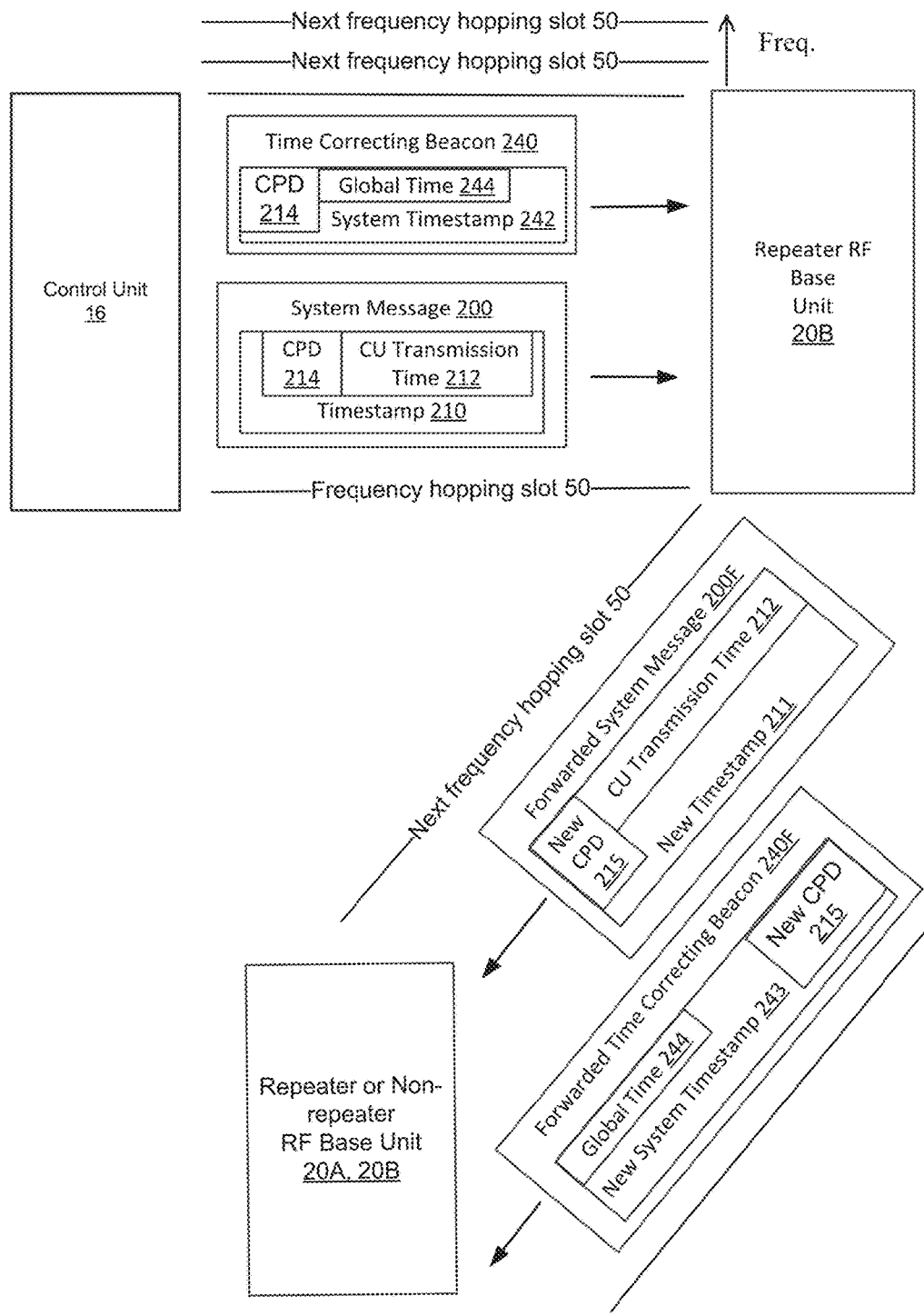
FIG. 7A is a schematic diagram of information and messages being exchanged as part of a synchronization process.
Figure 7B:
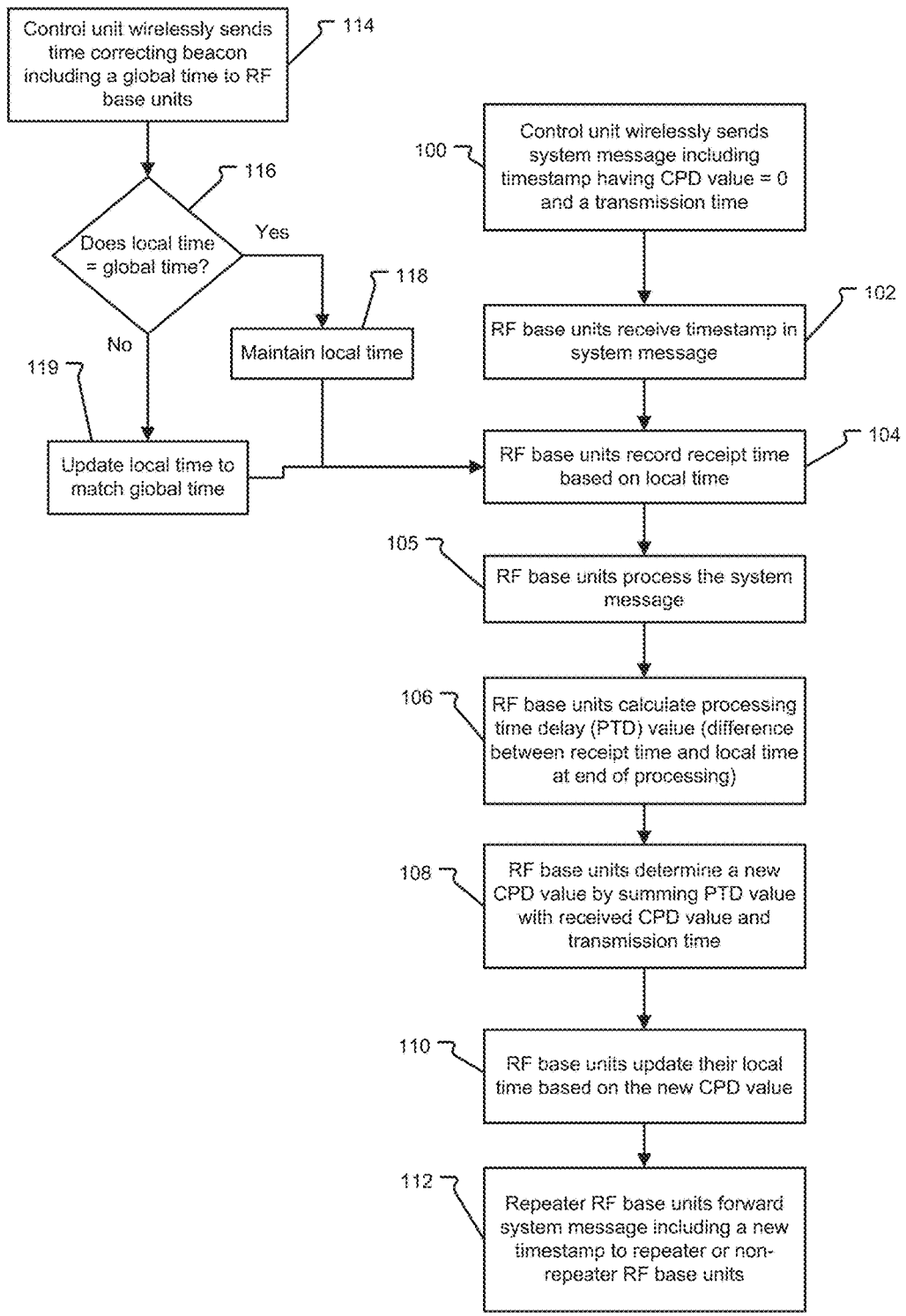
FIG. 7B is a flow chart of the synchronization process.

As illustrated in FIGS. 7A-7B, the wireless base units 20A, 20B (i.e., RF base units) perform a synchronization process. In step 100, a system message 200 including a timestamp 210 is sent from the control unit 16 to a RF base unit 20A, 20B (e.g., repeater RF base unit 20B). The timestamp 201 includes a control unit (CU) transmission time 212 (e.g., 32 bit value) and a cumulative propagation delay (CPD) value 214. The CU transmission time 212 indicates the time the message was transmitted from the control unit 16. Initially, the CPD value is set to 0 at the time of the originating transmission.

In step 102, each of the RF base units 20A, 20B that is in direct communication with the control unit 16 receives the timestamp 210 in the system message 200 through wireless links. Each RF base unit 20A, 20B has a local clock and thus maintains its own local time reference (i.e., local time).

The timestamp 210 is processed to update the local clock and time references (i.e., update local time) for the RF base units 20A, 20B. The RF base units 20A, 20B record the local time of the received system message 200 (i.e., receipt time) (step 104). Once the system message 200 is processed in step 105, the RF base units 20A, 20B calculate the processing time delay (PTD) value by comparing the receive time (i.e., receipt time) to the local time at the end of processing (step 106). Step 106 accounts for any processing delays for scheduling purposes or in the case of repeaters rebroadcasting messages. In step 108, a new CPD value is determined by adding the PTD value to the CPD value 214 along with the CU transmission time 212 (i.e., original transmission timestamp) from the control unit 16. In step 110, the RF base units 20A, 20B synchronize or update their local time based on the determined new CPD value. Finally, in the case of repeater RF base units 20B, a forwarded system message 200F including a new timestamp 211 is broadcast to its slave RF base units 20A, 20B in step 112. The new timestamp 211 includes the newly calculated CPD value 215 along with the CU transmission time 212 (i.e., original transmission timestamp) from the control unit 16. This process enables each subnet to be synchronized to the master panel system time compensating for the processing time of each repeater level so that local time for each RF base unit 20A, 20B matches the system time of the control unit 16 or alarm panel 12.

Time-Correcting System Beacon

Even with precision oscillators and crystals variations in local temperature and other factors including variations in the processor timing can cause electronic components timing circuits to drift and eventually not be in sync with other RF units. This drift could take days, hours, or even minutes to occur depending upon the precision that is required. The present invention addresses this problem by continuously broadcasting a time correcting system beacon 240 (including a system timestamp 242) at regular intervals. Using the system timestamp 242, all the RF base units 20A, 20B correct their individual time (i.e., local time) to match the global system time 244. Since this system timestamp 242 in the time correcting beacon 240 can be broadcast every second if desired, the precision of the system timestamp 242 can be continuously maintained and can have a resolution down into the microseconds if desired. Since the sync protocol requires 10 ms of accuracy, the system timestamp 242 could have a resolution of 1.0 ms, 500 microseconds (μs), 250 μs, 100 μs, or any other value that the master system chooses to use as a system time tick for processing that is within its capabilities to process and transmit.

In step 114, the control unit 16 wirelessly sends the time correcting beacon 240 that includes the timestamp 242 having the global system time 244. Each RF base unit 20A, 20B compares the received global system time 244 to their local time in step 116. If the local time is equal to the global system time 244, then the RF base unit 20A, 20B maintains its local time in step 118. If the local time is not equal to the global system time 244, the RF base unit 20A, 20B corrects its local time in step 119 as needed to stay synchronized. As a repeater RF base unit 20B, the RF base unit 20B is configured to pass the time-correcting system beacon to another RF base unit 20A, 20B as a forwarded time correcting beacon 240F via wireless links. This forwarded time correcting beacon 240F includes a new system timestamp 243 that has the global system time 244. As the forwarded time correcting system beacon 240F is broadcast through each repeater RF base unit 20B, each repeater RF base unit 20B adds its processing time from receiving the system beacon 240 to transmitting the forwarded system beacon 240 to the cumulative propagation delay (CPD) value. Thus, as shown in FIG. 7A, the CPD value 214 in the system beacon 240 is updated to the new CPD value 215 in the forwarded time correcting system beacon 240F by adding processing time.

Maximum System Propagation Delay Value

In order for the system to know the maximum time it would take all the devices to receive a message, the system must know what the propagation delay is to the farthest device (e.g., the device on the lowest-subnet level where a signal must go through the most repeater wireless base units 20B to be received). One method to determine that value is to calculate the value based on the average processing time for a repeater multiplied by the repeater depth. That method, however, merely provides a theoretical, estimated value and is thus considered undesirable. Accordingly, a significant aspect of the present invention involves using a method that obtains a more accurate propagation delay value. More particularly, a more accurate value may be gained by receiving the cumulative propagation delay time of the repeaters 20B and the non-repeater devices 20A during an ACK process. To reduce traffic, the repeaters 20B periodically send the largest cumulative propagation delay of the devices in its subnet during their system status check. The alarm panel 12 compares the received values and has a quantitative and known value for maximum propagation delay. During system diagnostics, known vs. calculated could be compared to see how system dynamics might be affected by RF traffic and local RF conditions.

Figure 8A:
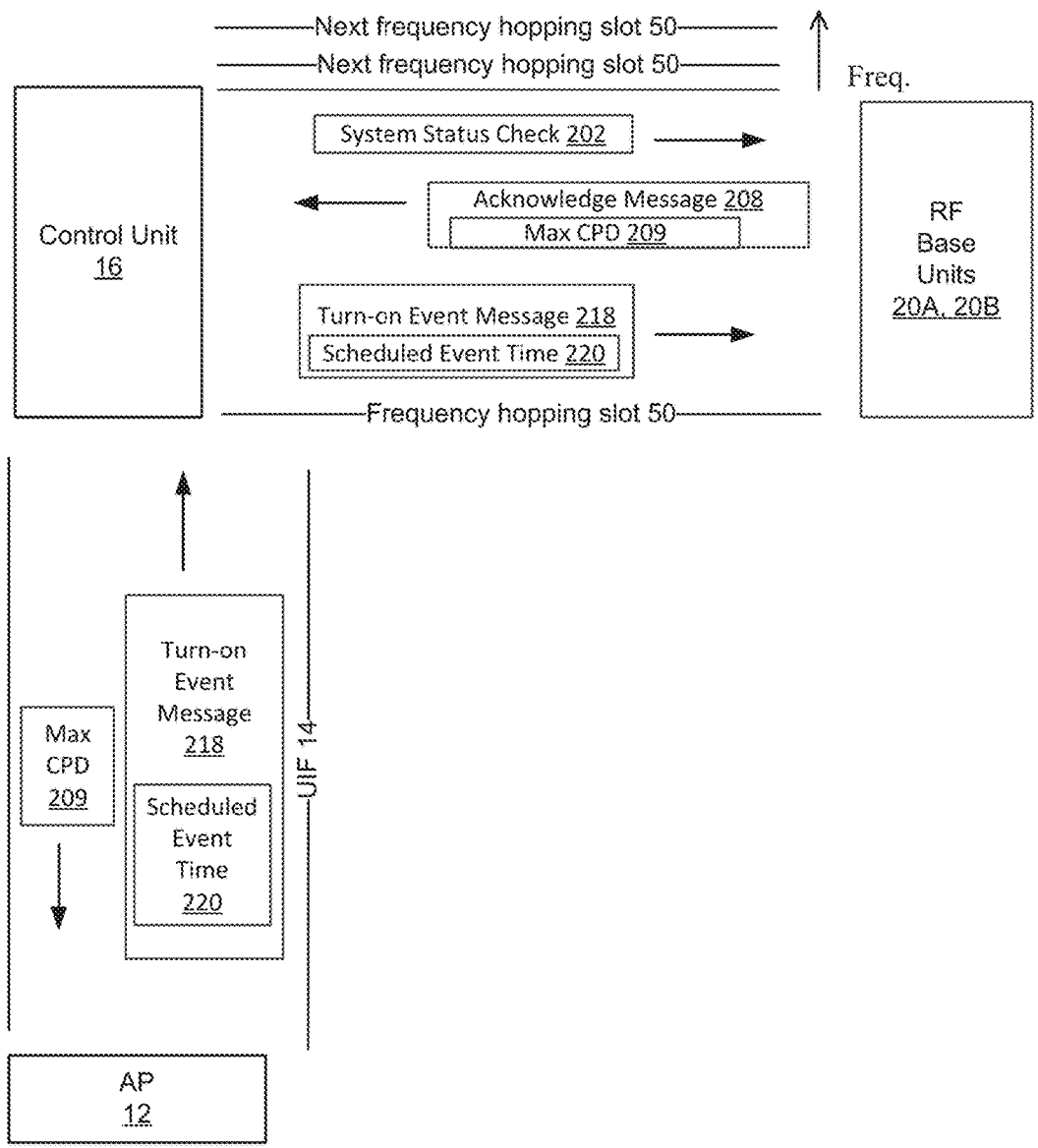
FIG. 8A is a schematic diagram of information and messages being exchanged as part of a process for determining a system maximum cumulative propagation delay time value and an event scheduling process.
Figure 8B:
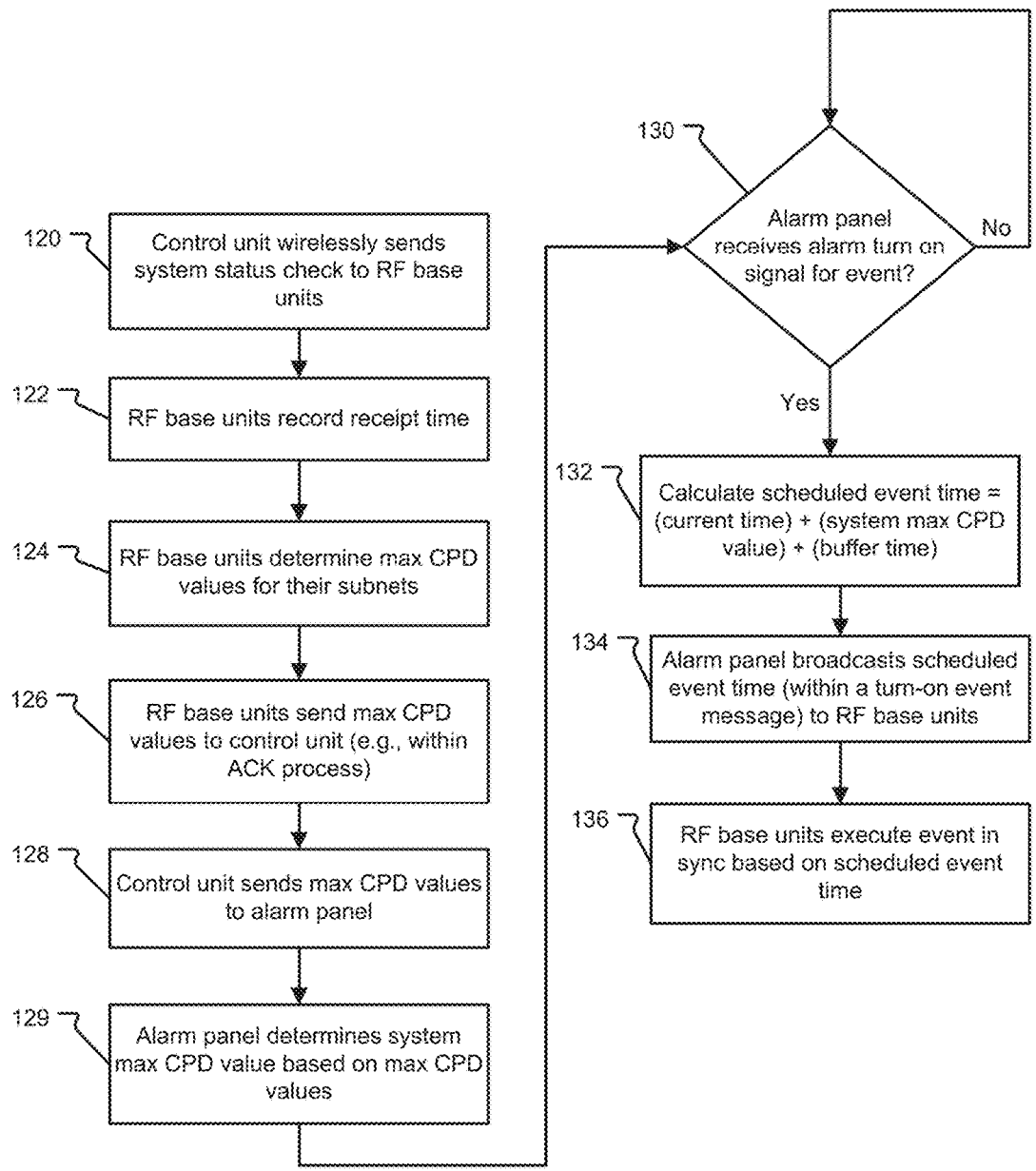
FIG. 8B is a flow chart of the process for determining the system max cumulative propagation delay time value and the event scheduling process.

This process for determining a system maximum cumulative propagation delay time value is illustrated in FIGS. 8A-8B. In step 120, the control unit 16 sends a system status check 202 to RF base units 20A, 20B. The RF base units record receipt time (step 122). In step 124, the RF base units 20A, 20B determines max cumulative propagation delay (CPD) values 209 for their subnets. The RF base units 20A, 20B sends max CPD values 209 within an acknowledgement message 208 to the control unit 16 (step 126). In step 128, the control unit 16 sends the max CPD values 209 to the alarm panel 12 via UIF 14. The alarm panel 12 determines the system max CPD value in step 129.

Scheduled Event Notification

Unlike wired systems, simply turning on an alarm signal and expecting all the devices to turn on at the same time and maintain sync due to the sync module is unworkable for a wireless system. Thus, the present invention overcomes this problem as follows. Upon receipt of an alarm turn-on signal (i.e., alarm activation), the alarm panel 12 processes the alarm turn-on signal and a corresponding turn-on event signal of the correct type is broadcast to the system 10 as a scheduled event to happen at a future moment in time. The scheduled event time is the current system time plus the maximum propagation time (determined as discussed above) plus a suitable buffer time to allow for possible message retries. Thus, if a system had a maximum propagation delay of 113 ms, and using a buffer time of 40 ms, the turn-on event signal would be scheduled to occur 153 ms from the broadcast time. All of the devices 20A, 20B receive the turn-on event signal, place it in their schedule buffer at the scheduled time, and set a pending alarm turn on a flag. Since the local time reference of each RF base unit 20A, 20B is synchronized to the alarm panel 12 when the global system time 244 is received, the corresponding alarm signal is executed in sync with the other devices in the wireless network.

This process for scheduling events is illustrated in FIGS. 8A-8B. This event scheduling process continues after the system max CPD is determined in step 129. In step 130, the alarm panel 12 checks whether it has received an alarm turn on signal for an event. If the alarm turn on signal is not received, step 130 repeats. Otherwise, if the alarm turn on signal is received, the alarm panel 12 calculates a scheduled event time 220 (step 132). The scheduled event time 220 is calculated by summing the current time with system max CPD value and buffer time. In step 134, the alarm panel 12 broadcasts the scheduled event time 220 in a turn-on event message 218 to RF base units 20A, 20B via the control unit 16. The RF base units 20A, 20B execute the event in sync based on the scheduled event time in step 136.

Validated Quick Sniff

In order to save power, the non-repeater RF base units 20A need to have their slave transceiver 32 turned off (i.e., deactivated) as much as possible but still receive messages. Waking up at their scheduled time, the slave transceiver 32 is turned on (i.e., activated) and sniffs the RF messages. Each message has a qualification header that allows the non-repeater RF base units 20A to sniff this header and qualify if the message pertains to it. If the header indicates that the message does not pertain to the RF base unit 20A, it will go back to sleep saving its power until the next scheduled wakeup. If it does pertain to it, it stays awake and processes the message accordingly. In this manner, by validating with a quick sniff, the RF base unit 20A can spend as much as 99% or more of its time asleep instead of processing messages that are not meant for it.

Figure 9A:
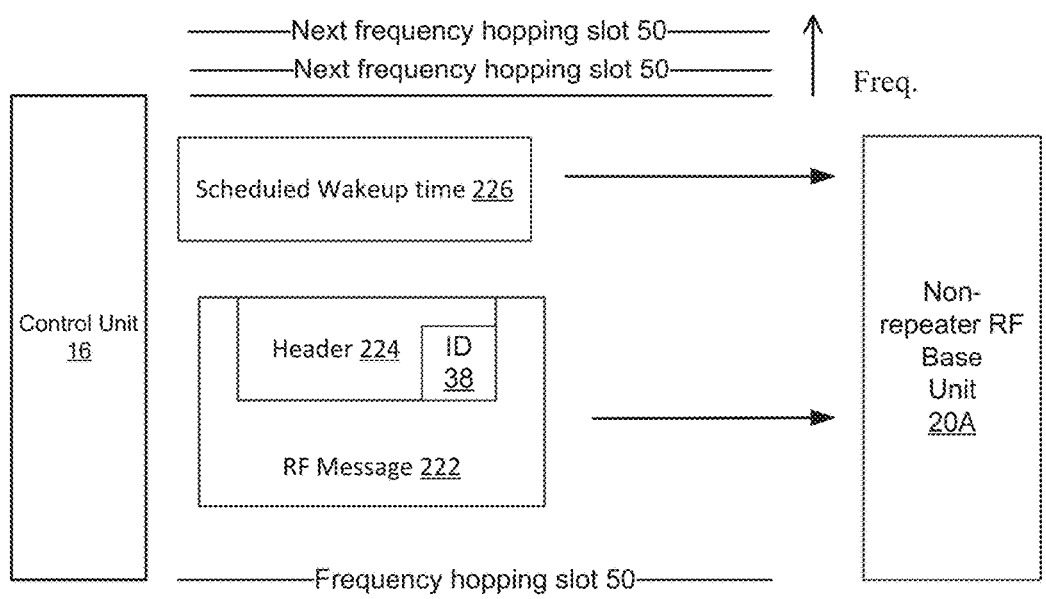
FIG. 9A is a schematic diagram of information and messages being exchanged as part of a validation quick sniff process.
Figure 9B:
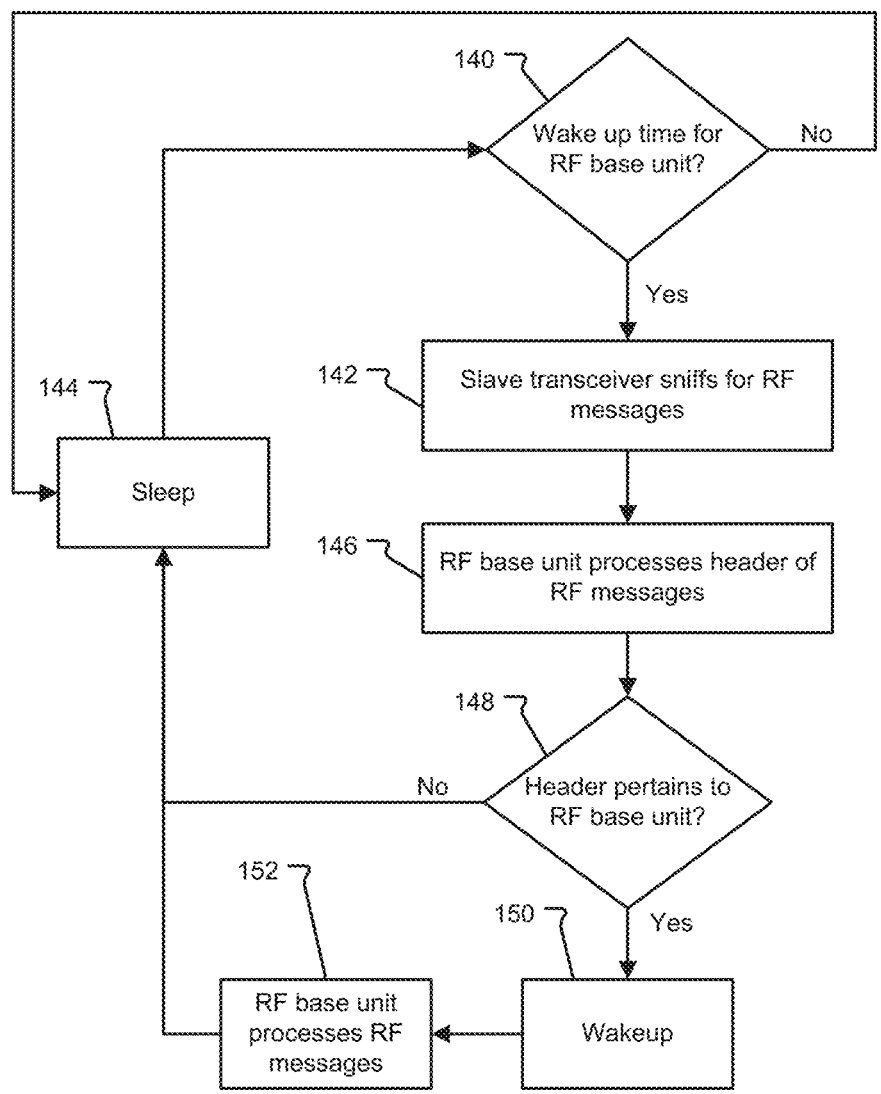
FIG. 9B is a flow chart of the validation quick sniff process.

This process for evaluating relevance of messages to minimize power consumption is illustrated in FIGS. 9A-9B. In step 140, the non-repeater RF base unit 20A checks for a predetermined scheduled wake up time 226 (received from control unit 16 as discussed previously). If the scheduled wake up time 226 occurs, the slave transceiver 32 is activated to sniff for RF messages 222 (step 142). Otherwise, the non-repeater RF base unit 20A stays in sleep mode and continues to check for wake up time 226 (step 144). In step 146, the RF base unit 20A processes header 224 of the RF messages 222. The RF base unit 20A determines if header 224 of each RF message 222 pertains to the RF base unit 20A (step 148). For example, the header 224 may be considered relevant if it includes the corresponding identification address 38 of the RF base units 20A. If the header 224 of the RF message 222 pertains to the RF base unit 20A, the RF base unit 20A wakes up in step 150 and processes RF messages in step 152. If the header 224 does not pertain to the RF base unit 20A, the RF base unit 20A stays in sleep mode (step 144). Then, cycles back to step 140 to check for scheduled wake up time 226.

In the case of RF base units 20B configured as repeaters, they must stay awake processing messages continuously, but may have an alternate source of power (e.g., external power source 48 or energy harvesting unit 23 in FIG. 3B) to handle this increased current demand.

In addition to the features listed above and in summation, the wireless mass notification system 10 in accordance with the present invention preferably includes the flowing features:

The wireless base units 20A, 20B can be modular in design.

The wireless base units 20A, 20B can allow horns 24, mini horns 22, strobes 28, and audio messaging modules (e.g., speakers 26) to be physically plugged into the wireless base unit 20A, 20B creating a unit with the appearance of a single physical unit.

Visual and Audio Modules (i.e., notification device 22, 24, 26, 28) have their own battery pack 21 or external power interface 44 as shown in FIG. 2A.

When the notification device type 205 is detected, the alarm panel 12 is notified so that the wireless base unit 20A, 20B can be programmed and a tamper 238 sent when removed as shown in FIG. 6.

Wireless base units 20A, 20B will monitor the integrity of the attached modules (e.g., visual and/or audio modules) and its power status 250 as illustrated in FIG. 6.

Three status LEDs on the wireless base unit 20A, 20B to indicate trouble status 207 of attached modules (i.e., notification device 22, 24, 26, 28) and in the case of a repeater wireless base unit 20B, there may be a power status LED and trouble status LED if an external AC power source (i.e., external power source 48 in FIGS. 3A-3B) is used to power the repeater functionality.

Each wireless base unit 20A, 20B can check in on a periodic basis with its status and the status of the attached modules by using the CU status check 234 as described above and shown in FIG. 6.

Wireless base units 20A, 20B have memory storage 31 for locally stored "canned" audio messages 39 and the ability to output live audio 216 that may be sent from the central alarm panel 12 and/or remote axillary panels as shown in FIG. 6.

Each wireless base unit 20B can optionally function as a repeater if it has dual transceivers (master transceiver 30 and slave transceiver 32) populated allowing the unit 20B to be configured as a repeater optionally using an external power source 48 (e.g., AC and a chargeable battery 21). Otherwise, the repeater wireless base unit 20B may operate from a non-rechargeable battery 21. These features are illustrated in FIGS. 3A-3B.

The system 10 may be scalable allowing systems to grow to meet end user requirements.

Units can have two independent battery power sources—one for RF base units 20A, 20B and one for alerts (i.e., notification devices 22, 24, 26, 28) as shown in FIGS. 2A-3B.

Synchronized visual strobes 28 can meet lumens intensity, viewing angle, flash rates as per UL. Visual strobes 28 should be synchronized to within 10 milliseconds (ms). Preferably, the strobes 28 are synchronized to within 1 ms synch or shorter.

Synchronized audio alerts with selectable patterns can be used for evacuation as per UL.

In locations where energy harvesting is not feasible, non-rechargeable battery technology can be used.

Modular energy harvesting options can be used to recharge alert batteries to reduce replacement cycle.

Audio messaging can meet intelligibility requirements.

Wireless base units 20A, 20B can support multiple programmable zones to enable addressable alerts that are targeted for certain physical zones/areas.

Programming can be performed from the alarm panel 12 or via a software program/application on PCs or smart devices connected by a variety of data connections options (e.g., some possible options include but are not limited to serial via USB, RS-232, RS-485, Bluetooth, Wi-Fi, Ethernet, Near Field Communication (NFC), etc.)

The universal interface module 14 includes multiple inputs for interfacing to existing alarm panels 12 (e.g., control panels, fire panels, mass evacuation panels, etc.). Input interfaces support contact closure (e.g., SLC, loop interface, RS-232 serial data, Ethernet, etc. and other interfaces as required).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining a system maximum cumulative propagation delay time value for wireless base units, comprising:
   the wireless base units determining maximum cumulative propagation delay time values for their subnets;
   the wireless base units sending the determined maximum cumulative propagation delay time values to an alarm panel; and
   the alarm panel determining a system maximum cumulative propagation delay time value by comparing the maximum cumulative propagation delay time values received from the wireless base units.

2. A method as claimed in claim 1, further comprising the alarm panel sending a system status check to the wireless base units prior to the wireless base units determining the maximum cumulative propagation delay time values.

3. A method as claimed in claim 1, further comprising the wireless base units sending the determined maximum cumulative propagation delay time values within acknowledgement (ACK) messages to the alarm panel.

4. A method as claimed in claim 1, further comprising the alarm panel predicting system dynamics based on the determined system maximum cumulative propagation delay time values.

5. A method as claimed in claim 1, further comprising the alarm panel including time stamps indicating message transmission time and a cumulative propagation delay value.

6. A method as claimed in claim 1, further comprising the wireless base units receiving time stamps in messages and comparing the received time stamps to local times kept by the wireless base units and based on the cumulative propagation delay values.

7. A method as claimed in claim 1, further comprising some of the wireless base units retransmitting messages from the alarm panel.

8. A method as claimed in claim 1, further comprising, the wireless base units, prior to retransmission, adding to the cumulative propagation delay value along with the original transmission timestamp.

9. A method as claimed in claim 1, further comprising each of the subnets having different repeater levels synchronizing to a system time of the alarm panel by compensating for processing time of each of the repeater levels.

10. A method as claimed in claim 1, further comprising the alarm panel broadcasting a system beacon, including a system time stamp, at regular intervals.

11. A method as claimed in claim 1, wherein the wireless base units correct their individual time to match a global system time based on timestamps from the alarm panel.

12. A method as claimed in claim 1, wherein the system maximum cumulative propagation delay time value is determined based on received cumulative propagation delay times of repeaters and the base units.

13. A method as claimed in claim 12, wherein the repeater units send to the alarm panel cumulative propagation delays for the devices in their subnets.

14. A method as claimed in claim 1, wherein during system diagnostics, known delay and calculated delay are compared to determine how system dynamics might be affected by wireless traffic and local wireless conditions.

15. A notification system, comprising:
   alarm panel; and
   wireless base units determining maximum cumulative propagation delay time values and sending the determined maximum cumulative propagation delay time values to the alarm panel,
   wherein the alarm panel determines a system maximum cumulative propagation delay time value by comparing the maximum cumulative propagation delay time values received from the wireless base units.

16. A system as claimed in claim 15, wherein the alarm panel sends a system status check to the wireless base units prior to the wireless base units determining the maximum cumulative propagation delay time values.

17. A system as claimed in claim 15, wherein the wireless base units send the determined maximum cumulative propagation delay time values within acknowledgement (ACK) messages to the alarm panel.

18. A system as claimed in claim 15, wherein alarm panel predicts system dynamics based on the determined system maximum cumulative propagation delay time values.

19. A system as claimed in claim 15, wherein the alarm panel sends time stamps indicating message transmission time and a cumulative propagation delay value.

20. A method for scheduling an event for wireless base units, comprising:
   an alarm panel determining a system maximum cumulative propagation delay time value;
   the alarm panel receiving an alarm turn on signal for an event;
   the alarm panel calculating a scheduled event time by summing the current time with the determined system maximum cumulative propagation delay time value;
   the alarm panel broadcasting the scheduled event time to the wireless base units; and
   the wireless base units executing the event in sync with each other based on the scheduled event time.

* * * * *